United States Patent
Song et al.

(10) Patent No.: US 11,737,080 B2
(45) Date of Patent: Aug. 22, 2023

(54) METHOD OF SCHEDULING PLURALITY OF PACKETS RELATED TO TASKS OF PLURALITY OF USER EQUIPMENTS USING ARTIFICIAL INTELLIGENCE AND ELECTRONIC DEVICE PERFORMING THE METHOD

(71) Applicant: SAMSUNG ELECTRONICS CO., LTD., Suwon-si (KR)

(72) Inventors: Juhwan Song, Suwon-si (KR); Taejeoung Kim, Suwon-si (KR); Taeseop Lee, Suwon-si (KR); Seowoo Jang, Suwon-si (KR); Minsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 17/233,975

(22) Filed: Apr. 19, 2021

(65) Prior Publication Data

US 2022/0104213 A1    Mar. 31, 2022

(30) Foreign Application Priority Data

Sep. 28, 2020    (KR) .................. 10-2020-0126358

(51) Int. Cl.
*H04W 72/121* (2023.01)
*G06N 20/00* (2019.01)
(Continued)

(52) U.S. Cl.
CPC .......... *H04W 72/121* (2013.01); *G06N 20/00* (2019.01); *H04B 7/0626* (2013.01); *H04W 28/0278* (2013.01); *H04W 72/569* (2023.01)

(58) Field of Classification Search
CPC .......... H04W 72/121; H04W 28/0278; H04W 72/1242; G06N 20/00; G06N 3/08;
(Continued)

(56) References Cited

U.S. PATENT DOCUMENTS

| 8,755,405 | B2 | 6/2014 | Kovvali et al. |
| 2003/0169746 | A1* | 9/2003 | Kitazawa ................ H04L 47/24 370/395.42 |

(Continued)

OTHER PUBLICATIONS

LTE Physical Layer Overview, 12 pages, http://rfmw.em.keysight.com/wireless/helpfiles/89600b/webhelp/subsystems/lte/content/lte_overview.htm, © 2000-2021 Keystone Technologies.
(Continued)

*Primary Examiner* — Hassan Kizou
*Assistant Examiner* — Oladiran Gideon Olaleye
(74) *Attorney, Agent, or Firm* — Nixon & Vanderhye P.C.

(57) ABSTRACT

Provided is a method, performed by an electronic device, of scheduling a plurality of packets to allocate radio resources to a plurality of packets related to tasks of a plurality of user equipments (UEs) and stacked in a queue, the method including: setting priorities for a plurality of packets stacked in the queue at a first point in time based on a preset scheduling parameter, allocating radio resources to at least some of the plurality of packets for which the priorities are set based on the set priorities, updating the scheduling parameter using at least one artificial intelligence (AI) learning model, and setting the priorities for the plurality of packets stacked in the queue at a second point in time later than the first point in time, based on the updated scheduling parameter.

22 Claims, 9 Drawing Sheets

(51) Int. Cl.
  *H04B 7/06* (2006.01)
  *H04W 28/02* (2009.01)
  *H04W 72/566* (2023.01)

(58) Field of Classification Search
  CPC .............. H04B 7/0626; H04L 47/6215; H04L 47/6225; H04L 47/80
  USPC ........................................................ 370/336
  See application file for complete search history.

(56) References Cited

U.S. PATENT DOCUMENTS

| | | | | |
|---|---|---|---|---|
| 2004/0037286 | A1* | 2/2004 | Huang | H04W 72/12 370/412 |
| 2005/0025056 | A1* | 2/2005 | Chen | H04W 8/04 370/328 |
| 2007/0121636 | A1* | 5/2007 | Kim | H04L 65/80 370/468 |
| 2008/0186909 | A1* | 8/2008 | Kim | H04W 28/14 370/328 |
| 2008/0310324 | A1* | 12/2008 | Chaponniere | H04W 28/12 370/254 |
| 2009/0010202 | A1* | 1/2009 | Masayuki | H04L 5/0007 370/328 |
| 2010/0232366 | A1 | 9/2010 | Iwamura et al. | |
| 2012/0281641 | A1* | 11/2012 | Cui | H04W 72/1226 370/329 |
| 2016/0066343 | A1* | 3/2016 | Lin | H04W 72/1205 370/336 |
| 2016/0183284 | A1* | 6/2016 | Chaudhuri | H04W 72/1242 370/329 |
| 2017/0048145 | A1* | 2/2017 | Shiraki | H04L 47/52 |
| 2017/0093740 | A1 | 3/2017 | Park et al. | |
| 2017/0265215 | A1* | 9/2017 | Chaudhuri | H04L 43/16 |
| 2018/0006780 | A1* | 1/2018 | Jeon | H04W 88/08 |
| 2018/0262437 | A1* | 9/2018 | Han | H04L 49/254 |
| 2020/0137769 | A1* | 4/2020 | Sun | H04W 72/042 |

OTHER PUBLICATIONS

International Search Report and Written Opinion dated Aug. 31, 2021 in corresponding International Application No. PCT/KR2021/005807.

Donghyun Kim et al., "Adaptive packet scheduling in IoT environment based on Q-learning", Procedia Computer Science 141 (2018), pp. 247-254, Nov. 5, 2018.

* cited by examiner

METHOD OF SCHEDULING PLURALITY OF PACKETS RELATED TO TASKS OF PLURALITY OF USER EQUIPMENTS USING ARTIFICIAL INTELLIGENCE AND ELECTRONIC DEVICE PERFORMING THE METHOD

CROSS-REFERENCE TO RELATED APPLICATION

This application is based on and claims priority under 35 U.S.C. § 119 to Korean Patent Application No. 10-2020-0126358, filed on Sep. 28, 2020, in the Korean Intellectual Property Office, the disclosure of which is incorporated by reference herein in its entirety.

BACKGROUND

1. Field

The disclosure relates to a method of scheduling a plurality of packets related to tasks of a plurality of user equipments (UEs) using artificial intelligence (AI) and an electronic device performing the method.

2. Description of Related Art

With the development of communication technologies, users may perform tasks in various forms by communicating with a base station using a user equipment (UE). For example, the users may transmit and receive voice messages or text messages, reproduce a sound source or an image, or use the Internet, using their respective UEs.

The base station may receive requests for allocating radio resources for a plurality of tasks from a plurality of UEs in the same time zone. The requests may be delivered to the base station in the form of packets, and priorities may be determined for the packets related to the requests based on types of the tasks or the UEs so as to fairly and seamlessly provide a service to the users. The base station may sequentially allocate the radio resources to the packets based on the priorities, allowing a UE to provide a corresponding service to a user.

Various scheduling algorithms for setting priorities for a plurality of packets in a base station have been introduced, but in application of each algorithm to a detailed environment, values of respective parameters included in the algorithm need to be set. For efficient packet scheduling, the values of the parameters need to be set differently according to an area where the base station is installed, a time, or a network operator that provides a communication service, and at the same time, the performance of the base station based on the parameters needs to satisfy criteria of mobile communication network operators. In addition, a type, a pattern, a channel state, etc., of services requested from a UE may vary with an area where the base station is installed or a time at which the base station is used, such that the values of the parameters used in the scheduling algorithm need to be periodically adjusted. However, a lot of time and labor force are required for setting or periodically changing the values of the parameters while satisfying the criteria, making it difficult to use an efficient and adaptive scheduling method.

SUMMARY

Embodiments of the disclosure address the foregoing problems, and provide a method of efficiently and adaptively scheduling a plurality of packets and an electronic device that performs the method.

Additional aspects will be set forth in part in the description which follows and, in part, will be apparent from the description.

According to an example embodiment, a method, performed by an electronic device, of scheduling a plurality of packets to allocate radio resources to a plurality of packets related to tasks of a plurality of user equipments (UEs) and stacked in a queue includes: setting priorities for a plurality of packets stacked in the queue at a first point in time based on a preset scheduling parameter, allocating radio resources to at least some of the plurality of packets for which the priorities are set based on the set priorities, updating the scheduling parameter using at least one artificial intelligence (AI) learning model, and setting the priorities for the plurality of packets stacked in the queue at a second point in time later than the first point in time, based on the updated scheduling parameter.

According to an example embodiment, an electronic device for scheduling a plurality of packets to allocate radio resources to a plurality of packets related to tasks of a plurality of user equipments (UEs) and stacked in a queue includes: at least one processor and a memory connected to the at least one processor and storing a scheduling parameter, wherein the at least one processor is configured to: set priorities for a plurality of packets stacked in the queue at a first point in time based on a preset scheduling parameter, allocate radio resources to at least some of the plurality of packets for which the priorities are set based on the set priorities, obtain a scheduling parameter updated using at least one artificial intelligence (AI) learning model, and set the priorities for the plurality of packets stacked in the queue at a second point in time later than the first point in time, based on the updated scheduling parameter.

According to an example embodiment of the disclosure, a system for scheduling a plurality of packets to allocate radio resources to a plurality of packets related to tasks of a plurality of user equipments (UEs) and stacked in a queue includes: an artificial intelligence (AI) module including at least one AI learning model and a data processor, the AI module configured to: set priorities for a plurality of packets stacked in the queue at a first point in time based on a preset scheduling parameter, allocate radio resources to at least some of the plurality of packets for which the priorities are set based on the set priorities, obtain a scheduling parameter updated using at least one artificial intelligence (AI) learning model of the AI module, and set the priorities for the plurality of packets stacked in the queue at a second point in time later than the first point in time, based on the updated scheduling parameter, wherein the AI module is configured to: obtain, from the data processor, packet processing information based on allocating the radio resources to the at least some of the plurality of packets for which the priorities are set, generate the updated scheduling parameter based on the obtained packet processing information, using the at least one AI learning model, and deliver the updated scheduling parameter to the data processor.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

With regard to the description of the drawings, the same or similar reference numerals may be used to refer to the same or similar components.

DETAILED DESCRIPTION

Throughout the disclosure, the expression "at least one of a, b or c" indicates only a, only b, only c, both a and b, both a and c, both b and c, all of a, b, and c, or variations thereof.

Figure 1:
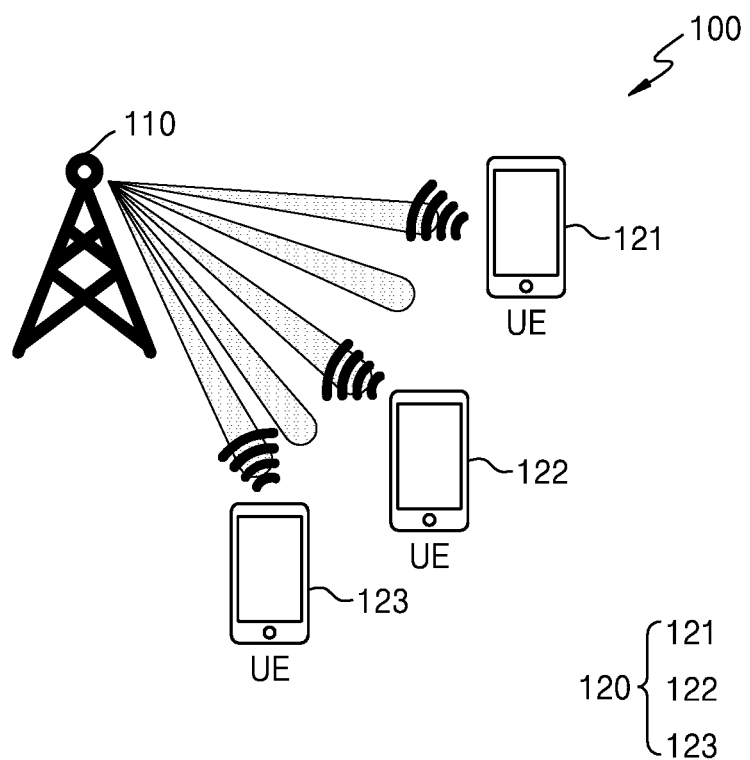
FIG. 1 is a diagram illustrating an example communication system including a base station and a plurality of user equipments (UEs), according to various embodiments.

FIG. 1 is a diagram illustrating an example communication system including a base station and a plurality of user equipments (UEs), according to various embodiments.

Referring to FIG. 1, a communication system 100 may include a base station 110, a first UE, a second UE 122, and a third UE 123. According to various embodiments, the number of UEs 120 included in the communication system 100 may not be limited to the illustration of FIG. 1.

According to an embodiment, the plurality of UEs 120 may be connected with at least one base station 110 to transmit requests for radio resource allocation to the at least one base station 110, and the base station 110 may allocate radio resources to the plurality of UEs 120 in response to the requests. In various embodiments, a radio resource may be understood to refer, for example, to a frequency resource for wireless communication as a limited resource that may be shared among a limited number of users during a specific time. In an embodiment, the radio resource may refer, for example, to a resource block (RB) in wireless communication of an orthogonal frequency division multiplexing (OFDM) scheme.

According to an embodiment, the plurality of UEs may request the base station 110 to allocate radio resources for performing various tasks. For example, the first UE 121 may request allocation of a radio resource to use the Internet, the second UE 122 may request allocation of a radio resource for voice communication, and the third UE 123 may request allocation of a radio resource to stream an image. In an embodiment, when the plurality of UEs 120 transmit requests for allocating radio resources at the same point in time to perform various tasks, the base station 110 may obtain a plurality of packets for the requests and set priorities for the plurality of packets. For example, the base station 110 may set a priority for a request of the third UE 123 higher than a priority for a request of the first UE 121 and set a priority for a request of the second UE 122 higher than a priority for the request of the third UE 123. The base station 110 may sequentially allocate radio resources to the plurality of packets according to the set priorities, and the plurality of UEs 120 may perform requested tasks.

Figure 2:
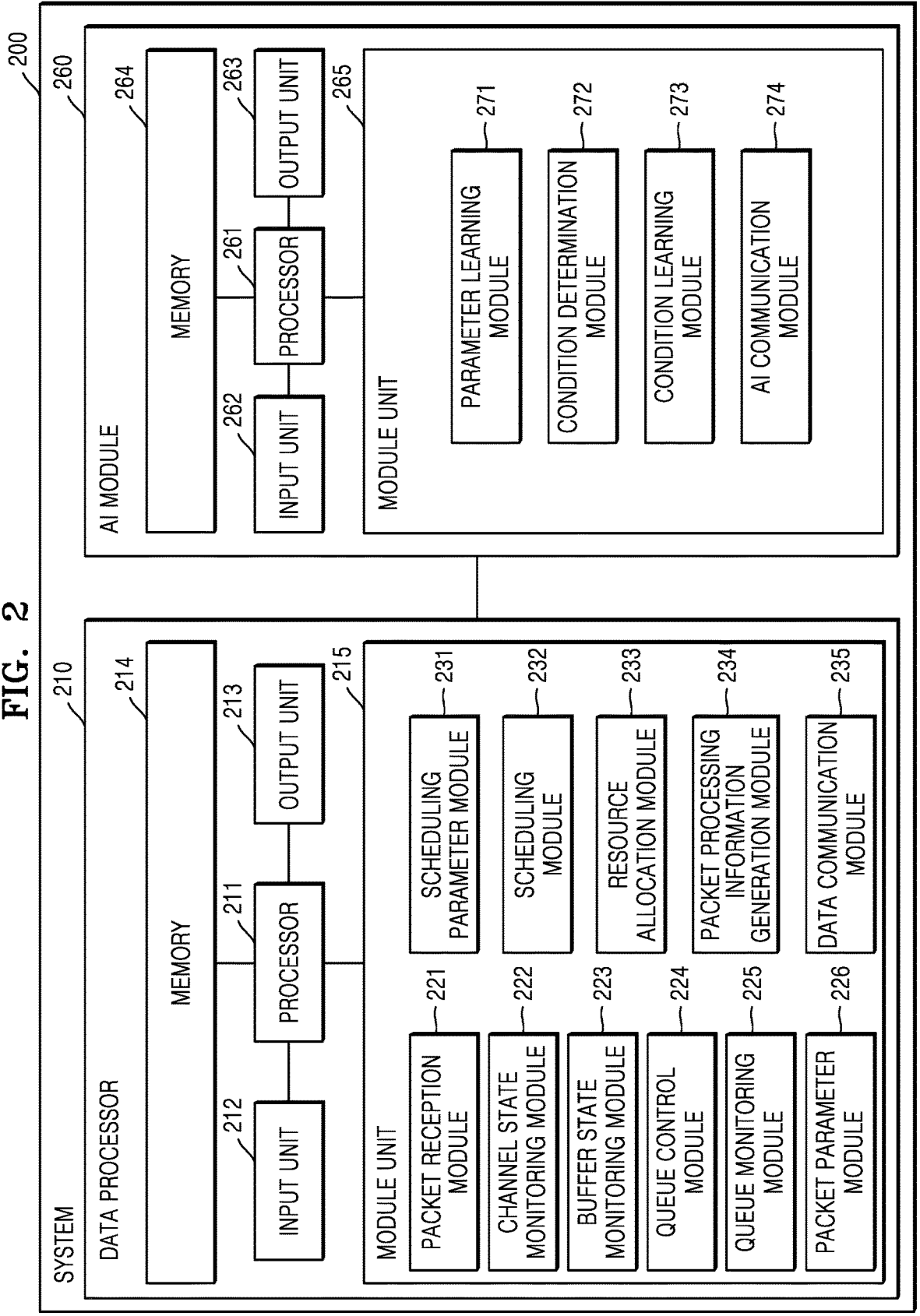
FIG. 2 is a block diagram illustrating an example system for scheduling a plurality of packets related to tasks of a plurality of UEs, according to various embodiments.

FIG. 2 is a block diagram illustrating an example system for scheduling a plurality of packets related to tasks of a plurality of UEs, according to various embodiments.

Referring to FIG. 2, a system 200 may include a data processor (e.g., including processing circuitry) 210 and an AI module (e.g., including processing circuitry and/or executable program elements) 260. According to an embodiment, the data processor 210 and the AI module 260 may transmit or receive data using their communication modules (e.g., a data communication module 235 and an AI communication module 274). In various embodiments, the data processor 210 and the AI module 260 may transmit and/or receive data through wired connection (e.g., the Ethernet, the Infiniband, etc.) or wireless connection (e.g., Wireless Fidelity (WiFi), cellular communication, etc.) therebetween. In an embodiment, the AI module 260 may be implemented using a tensor processing unit (TPU) of a universal serial bus (USB) type, Jetson Nano, etc., and may be connected with the data processor 210 through various interfaces (e.g., USB 2.0, USB 3.0, etc.) within a short range. In this case, a data transmission time between the AI module 260 and the data processor 210 may be relatively reduced. In various embodiments, the data processor 210 may be understood as the base station 110 or included in the base station 110 illustrated in FIG. 1.

The data processor 210 may receive data from a plurality of UEs (e.g., the plurality of UEs 120 of FIG. 1), process the received data, and transmit the processed data to the plurality of UEs. For example, the data processor 210 may receive requests for allocating resources (e.g., radio resources) for tasks to be performed in the plurality of UEs from the plurality of UEs. In another example, the data processor 210 may schedule an order of the tasks based on algorithms designated for the received requests and allocate resources to the plurality of UEs based on the scheduled order of the tasks. According to an embodiment of the disclosure, the data processor 210 may transmit data to the AI module 260, receive data from the AI module 260, and process data to be transmitted or received data. For example, the data processor 210 may transmit one or more of data for the plurality of tasks requested from the plurality of UEs, data regarding the priorities set for the plurality of tasks, or data regarding a resource allocation result based on the priorities to the AI module 260. In another example, the data processor 210 may receive data related to a parameter required for setting the priorities from the AI module 260.

According to an embodiment of the disclosure, the data processor 210 may include a processor (e.g., including processing circuitry) 211, an input unit (e.g., including input circuitry) 212, an output unit (e.g., including output circuitry) 213, a memory 214, and a module unit (e.g., including various modules including various processing circuitry and/or executable program elements) 215. In various embodiments, the data processor 210 may omit at least one of components illustrated in FIG. 2 without being limited to FIG. 2, and may further include a component not illustrated in FIG. 2. For example, a plurality of operable modules are illustrated as being included in the module unit 215 in FIG. 2, but at least some of the plurality of modules may be implemented as software modules stored in the memory 214. For example, a packet reception module 221 may be stored as a software module in the memory 214, instead of being implemented as a separate hardware module included in the module unit 215 as shown in FIG. 2, and may operate by being executed by the processor 211, or may be any combination thereof. According to an embodiment of the disclosure, in response to at least one input obtained through the input unit 212, the processor 211 may generate at least one data and output the generated at least one data to an outside of the data processor 210 through the output unit 213, by executing at least one module included in the module unit 215. According to an embodiment, modules included in the module unit 215 may not be limited to the illustration of FIG. 2. For example, at least some of the modules illustrated in FIG. 2 may be expressed as one another module, and the modules illustrated in FIG. 2 may be expressed as a plurality of other modules and another module not illustrated in FIG. 2 may be further included in the module unit 215.

According to various embodiments, the data processor 210 may include various processing circuitry, such as, for example, and without limitation, at least one of digital unit (DU) base station equipment, an X86-based DU emulator, a system level simulator, a processing module of a virtualized radio access network (vRAN), or the like.

The packet reception module 221 may include various processing circuitry and/or executable program elements and receive the plurality of packets related to tasks of the plurality of UEs, by being executed by the processor 211. For example, the plurality of UEs may transmit requests for allocating radio resources for service providing to provide different services (e.g., voice communication, video streaming, the Internet, etc.) to respective users, and the packet reception module 221 may receive the plurality of packets indicating the requests for allocating the radio resources.

According to an embodiment, the plurality of packets may be distinguished based on UEs or a type of services to be provided. For example, each packet may include information about an identification value of a UE or an identification value of a bearer for each UE and information about an identification value of a service to be provided. In an embodiment of the disclosure, the bearer may be understood as referring, for example, to one or more carriers existing between each UE and the data processor 210 for data transmission and reception.

According to an embodiment, the priorities for the plurality of packets may be set based on a quality of a service (QoS) of a provided service. For example, a required QoS may differ with a type of each provided service, and a priority for a packet related to a service that needs to be executed earlier based on the required QoS may be relatively high. In an embodiment, each packet may include information about a parameter (e.g., a QoS class identifier (001)) indicating a priority for a required QoS.

A channel state monitoring module 222 may include various processing circuitry and/or executable program elements and obtain, periodically at designated time intervals, channel state information (CSI) indicating a channel state of each of the plurality of UEs, by being executed by the processor 211. For example, the designated time interval may, for example, be a time corresponding to one symbol, one slot, one subframe, one half-frame, one frame, etc. In an embodiment, the CSI, which is information generated in each of the plurality of UEs, may be a quality measurement result with respect to reception of a reference signal transmitted from the base station, and may be understood as referring, for example, to information reported to the base station from the plurality of UEs. In an embodiment, the CSI may include at least one of a pre-coding matrix indicator (PMI), a rank indicator (RI), or a channel quality indicator (CQI). The CSI obtained for the plurality of UEs may be used to set the priorities for the packets obtained by the packet reception module 221. For example, the CSI may be used to calculate a modulation order product code rate (MPR) for each packet among packet parameters used to set the priorities.

A buffer state monitoring module 223 may include various processing circuitry and/or executable program elements and obtain, periodically at designated time intervals, a buffer occupancy (BO) for the plurality of UEs, by being executed by the processor 211. According to an embodiment, the BO, which may, for example, indicate or refer to a level of occupancy of data with respect to a buffer of a radio bearer (RB) for each of the plurality of UEs, may be understood as referring, for example, to information that is generated by each of the plurality of UEs and is reported to the base station. The BO may refer, for example, to the amount of data to be currently transmitted by each UE. For example, the BO may increase when a plurality of new packets are obtained from each UE, and may decrease when at least some of the plurality of packets are allocated with radio resources and thus are processed. The BO obtained for the plurality of UEs may be used to set the priorities for the packets obtained by the packet reception module 221. For example, the CSI may be used to calculate a transport block size (TBS) among the packet parameters used to set the priorities.

A queue control module 224 may include various processing circuitry and/or executable program elements and stack the plurality of packets obtained from the packet reception module 221 and data related to the plurality of packets in a queue, by being executed by the processor 211. The data related to the plurality of packets may include at least one of an identification number of a UE, an identification number of a bearer in each UE, or a packet parameter, for, e.g., each of the plurality of packets. In an embodiment, the identification number of the UE or the identification number of the bearer for each of the plurality of packets may be obtained from the packet reception module 221, and the packet parameter may be obtained from the packet parameter module 226. According to an embodiment, the queue control module 224 may integrate a plurality of packets and data related to each of the plurality of packets into one buffer and stack a buffer corresponding to each packet in the queue. In an embodiment, a packet may be stacked in the form of a buffer in the queue, such that stacking of the packet in the queue or removal of the packet from the queue may be understood as referring, for example, to being the same as or similar to stacking of the buffer corresponding to the packet in the queue or removal of the buffer corresponding to the packet from the queue.

According to an embodiment, the queue control module 224 may remove at least some of packets stacked in the queue from the queue. For example, the queue control module 224 may remove packets allocated with a radio resource from the queue among the packets stacked in the queue. In various embodiments, the queue control module 224 may adjust the number of packets stacked in the queue by stacking packets in the queue or removing packets from the queue.

A queue monitoring module 225 may include various processing circuitry and/or executable program elements and monitor a state of the queue including a plurality of packets, by being executed by the processor 211. According to an embodiment, the plurality of packets obtained from the packet reception module 221 may be stacked in the queue based on a designated order. For example, the plurality of packets may be sequentially stacked based on a QoS priority for a provided service. In another example, the plurality of packets having the same QoS priority may be stacked sequentially in order based on a priority set by the scheduling module 232.

According to an embodiment, the queue monitoring module 225 may monitor the amount of packets remaining in the queue. For example, radio resources may be allocated to some of packets stacked in the queue, and the amount of remaining packets may be monitored by the queue monitoring module 225. In an embodiment, the queue monitoring module 225 may detect a speed at which the plurality of packets are processed, by monitoring the amount of packets remaining in the queue at designated time intervals.

The packet parameter module 226 may include various processing circuitry and/or executable program elements and calculate a packet parameter by being executed by the processor 211. The packet parameter may be understood as referring, for example, to a parameter used to set a priority for each of the plurality of packets stacked in the queue. In an embodiment, the packet parameter may be a parameter calculated for each packet. For example, the packet parameter module 226 may generate a packet parameter for each packet using the CSI obtained by the channel state monitoring module 222 and the BO obtained by the buffer state monitoring module 223. According to an embodiment, the packet parameter may include at least one of the MPR or the TBS.

In an embodiment, the MPR may be calculated from the CSI. According to an embodiment, the CSI may include a CQI which may be understood as referring, for example, to information indicating the quality of a channel measured by a UE. In an embodiment, the MPR may be understood as referring, for example, to a value of Code Rate×1024 on a CQI index table defined in the standards. The MPR may be calculated by selecting a value of Code Rate×1024 corresponding to the CQI obtained from the CSI.

In an embodiment, the TBS may indicate a radio resource allocation to each UE, and may be calculated from the BO. The TBS may be understood as referring, for example, to a radio resource allocation successfully transmitted after scheduling, and may be determined according to a situation of a base station (e.g., a cell bandwidth, etc.) or a situation of a UE (e.g., a channel state, a modulation coding scheme (MCS) level, etc.).

According to an embodiment, the packet parameter may include a rank indicator (RI). The RI may be included in the CSI, and may refer, for example, to information about a channel link which may refer, for example, to the maximum number of layers (or streams) transmitting different information through the same time-frequency resource. In an embodiment of the disclosure, the packet parameter may include a QCI parameter related to a QoS priority for a provided service.

A scheduling parameter module 231 may include various processing circuitry and/or executable program elements and configure a scheduling parameter required for setting priorities for a plurality of packets, by being executed by the processor 211. In an embodiment of the disclosure, the scheduling parameter may include, for example, a parameter which is distinguished from the packet parameter calculated for each packet and configured according to a state or method of scheduling. For example, the scheduling parameter may be updated based on a scheduling processing state, to a new parameter having an improved scheduling processing state. In another example, the scheduling parameter may be a parameter related to any one scheduling method of proportional fair scheduling, round-robin scheduling, and max carrier to interference (C/I) scheduling. According to various embodiments, the scheduling parameter may be understood as referring, for example, to a value indicating a weight value for various criteria for scheduling, e.g., a channel state or a resource allocation to each UE.

According to an embodiment, with a proportional fair scheduling method, P indicating a priority indicator of a packet may be expressed as below.

$$P = \frac{MPR^\beta}{TBS^\alpha}$$

Herein, MPR, which is a packet parameter, may refer, for example, to a modulation order product code rate (MPR) for each packet, and TBS, which is a packet parameter, may refer, for example, to a transport block size, in which $\alpha$ and $\beta$ may indicate indices of the TBS and the MPR. The priority indicator P may be set for each packet in which a priority may be determined in order from the greatest P to the least P. For example, a packet having the greater P may be understood as having the higher priority than a priority for a packet having the smaller P.

In an embodiment, a scheduling parameter as a parameter related to proportional fair scheduling may include $\alpha$ and $\beta$. According to various embodiments, $\alpha$ and $\beta$ may indicate weight values for the TBS and the MPR, and may be configured considering a surrounding environment of the plurality of UEs and the data processor 210. For example, when it is determined based on the surrounding environment of the plurality of UEs and the data processor 210 to be appropriate to consider more a channel state of each of the plurality of UEs than a resource allocation to each of the plurality of UEs, $\alpha$ may be reduced and $\beta$ may be increased. For example, when a difference between the number of UEs corresponding to a strong electric field and the number of UEs corresponding to a weak electric field is less than a designated level or when a deviation of an MPR for each UE is less than a designated level, a difference in resource allocation between UEs may be less than a designated level in spite of an increase in $\beta$, such that a may be reduced and $\beta$ may be increased to increase a total throughput. In another example, when it is determined based on the surrounding environment of the plurality of UEs and the data processor 210 to be appropriate to consider more the resource allocation to each of the plurality of UEs than the channel state of each of the plurality of UEs, a may be increased and $\beta$ may be reduced. For example, when the difference between the number of UEs corresponding to the strong electric field and the number of UEs corresponding to the weak electric field is greater than the designated level or when the deviation of the MPR for each UE is greater than the designated level, UEs corresponding to the weak electric field may not be allocated with radio resources when $\beta$ is increased, such that a may be increased and β may be reduced to equalize a resource allocation to each UE.

According to an embodiment, α and β may be adjusted according to criteria of mobile communication network operators. For example, when a criterion of the mobile communication network operators is prioritizing increasing a total radio resource allocation or a total throughput of packets, a may be set to a relatively lower value and β may be set to a relatively higher value. In another example, when the criterion of the mobile communication network operators is prioritizing uniform and stable radio resource allocation to each UE, a may be set to a relatively higher value and β may be set to a relatively higher value.

In an embodiment, a scheduling parameter as a parameter related to proportional fair scheduling may further include an infinite impulse response (IIR) filter coefficient indicating a measurement period of a TBS. In an embodiment, the IIR filter coefficient may be understood as referring, for example, to a parameter related to an average throughput like the following equation.

$$T_{n+1} = (1-i) \times T_n + i \times R_n$$

$T_{n+1}$ and $T_n$ may respectively indicate average throughputs, $R_n$ may indicate a transmission speed at a current point in time, and i may indicate an IIR filter coefficient. In various embodiments, when the IIR filter coefficient increases, an average throughput may be calculated by applying a higher weight value to the transmission speed at the current point in time than to a previous average throughput; when the IIR filter coefficient decreases, the average throughput may be calculated by applying a higher weight value to the previous average throughput than to the transmission speed at the current point in time.

According to an embodiment, when the IIR filter coefficient increases, a measurement period of a TBS may be lengthened and a TBS in the farther past may be considered. In an embodiment of the disclosure, when the IIR filter coefficient decreases, a measurement period of a TBS may be shortened and a TBS in the closer past may be considered. According to an embodiment, when connection and disconnection of the UEs to the base station relatively frequently occur, the IIR filter coefficient may be set low relatively; when connection and disconnection of the UEs to the base station do not frequently occur, the IIR filter coefficient may be set high relatively.

According to an embodiment, when round-robin scheduling is used, β may have a value of 0 for the priority indicator P, and a scheduling parameter related to max C/I scheduling may include a and further include the IIR filter coefficient. According to an embodiment of the disclosure, when max C/I scheduling is used, a may have a value of 0 for the priority indicator P, and a scheduling parameter related to round-robin scheduling may include β and further include the IIR filter coefficient.

According to an embodiment, the scheduling parameter may have a preset initial value. In an embodiment of the disclosure, the scheduling parameter module 231 may set the scheduling parameter to the preset initial value at every elapse of a designated time. In an embodiment of the disclosure, the scheduling parameter module 231 may set the scheduling parameter to the preset initial value when the amount of packets remaining in the queue is greater than or equal to a designated level. The amount of packets remaining in the queue may be obtained from the queue monitoring module 225.

According to an embodiment, the scheduling parameter may be updated to a new value. For example, the scheduling parameter module 231 may obtain a new scheduling parameter from the AI module 260 upon elapse of a preset time, and update an existing scheduling parameter with the new scheduling parameter. In an embodiment of the disclosure, the scheduling parameter module 231 may be temporally synchronized with the AI module 260 based on the preset time. In an embodiment, when the new scheduling parameter has the same value as the existing scheduling parameter, the scheduling parameter module 231 may maintain the existing scheduling parameter.

In another example, regardless of the elapse of the designated time, the scheduling parameter module 231 may update the existing scheduling parameter when there is the new scheduling parameter obtained from the AI module 260. In an embodiment of the disclosure, the scheduling parameter module 231 may not be temporally synchronized with the AI module 260. For example, the scheduling parameter module 231 may detect that the AI module 260 has delivered the new scheduling parameter, and obtain the new scheduling parameter.

The scheduling module 232 may include various processing circuitry and/or executable program elements and set the priorities for the plurality of packets stacked in the queue, by being executed by the processor 211. In various embodiments, the scheduling module 232 may set the priorities for the plurality of packets using any one scheduling of proportional fair scheduling, round-robin scheduling, and max C/I scheduling.

According to an embodiment, the scheduling module 232 may set the priorities for the plurality of packets stacked in the queue, based on the scheduling parameter. For example, the scheduling parameter may be set to the preset initial value, and the scheduling module 232 may set the priorities for the plurality of packets based on the preset scheduling parameter. In another example, when the scheduling parameter is updated, the scheduling module 232 may set the priorities for the plurality of packets based on the updated scheduling parameter.

According to an embodiment, the scheduling module 232 may set the priorities for the plurality of packets stacked in the queue, based on the scheduling parameter and the packet parameter. According to an embodiment of the disclosure, the scheduling module 232 may set the priorities for the plurality of packets using proportional fair scheduling, and in this case, the priority indicator P may be expressed as below.

$$P_{pf} = \frac{MPR^\beta}{TBS^\alpha}$$

In an embodiment, the scheduling module 232 may calculate the priority indicator P for each packet based on the scheduling parameter and the packet parameter, and set the priorities for the plurality of packets in order from the greatest P to the least P.

According to various embodiments, the priority indicator P may be expressed unlike the equation without being limited to the equation. For example, the priority indicator P may be expressed as a product of the equation and the RI. In another example, according to round-robin scheduling, the priority indicator P may be expressed as below without considering a channel state.

$$P_{rr} = \frac{1}{TBS^\alpha}$$

In another example, according to max C/I scheduling, the priority indicator P may be expressed as below without considering a current resource allocation.

$$P_m = MPR^\beta$$

The resource allocation module 233 may include various processing circuitry and/or executable program elements and allocate radio resources to at least some of the plurality of packets for which the priorities are set, by being executed by the processor 211. According to an embodiment, the resource allocation module 233 may allocate radio resources to a designated number of packets from the highest-priority packet, based on the set priorities.

A packet processing information generation module 234 may include various processing circuitry and/or executable program elements and generate packet processing information as a result of allocating the radio resources to at least some of the plurality of packets for which the priorities are set, by being executed by the processor 211. In various embodiments, the packet processing information, which is information related to a key performance indicator (KPI) of a mobile communication network operator, may be understood as referring, for example, to at least one of a packet throughput for all of a plurality of UEs, a packet throughput for each UE, a deviation of a packet throughput for each UE, a packet processing delay time, or other information collected to determine a packet processing efficiency.

The data communication module 235 may include various processing circuitry and/or executable program elements and transmit and/or receive data to and/or from the plurality of UEs or the AI module 260, by being executed by the processor 211. For example, the data communication module 235 may transmit the plurality of packets obtained from the packet reception module 221, the CSI obtained from the channel state monitoring module 222, or the BO obtained from the buffer state monitoring module 223 to the AI module 260. In another example, the data communication module 235 may transmit the packet processing information obtained from the packet processing information generation module 234 to the AI module 260. In another example, the data communication module 235 may receive the updated scheduling parameter from the AI module 260.

The AI module 260 may obtain data from the data processor 210 by communicating with the data processor 210, perform at least one AI learning based on the obtained data, output at least one data as a result of performing the AI learning, and deliver the output data to the data processor 210. According to an embodiment, the AI module 260 may be configured as a separate module distinguished from the data processor 210. For example, the AI module 260 may include a processor (e.g., including processing circuitry) 261 that is distinguished from the processor 211 of the data processor 210, and the processor 261 may perform AI learning separately from the processor 211 of the data processor 210. In this way, the data processor 210 may prevent and/or reduce degradation of a data processing speed, regardless of AI learning performed in the AI module 260. In various embodiments, when the AI module 260 performs AI learning, it may be understood as being equal or similar to training of at least one AI model.

According to an embodiment of the disclosure, the AI module 260 may include the processor (e.g., including processing circuitry) 261, an input unit (e.g., including input circuitry) 262, an output unit (e.g., including output circuitry) 263, a memory 264, and a module unit (e.g., including various modules each including various processing circuitry and/or executable program elements) 265. In various embodiments, the AI module 260 may not include at least one of components illustrated in FIG. 2 without being limited to FIG. 2, and may further include a component not illustrated in FIG. 2. For example, a plurality of operable modules are illustrated as being included in the module unit 265 in FIG. 2, but at least some of the plurality of modules may be implemented as software modules stored in the memory 264. According to an embodiment, with respect to at least one input obtained through the input unit 262, the processor 261 may generate at least one output and output the generated at least one output to an outside through the output unit 263, by executing at least one module included in the module unit 265. According to an embodiment, modules included in the module unit 265 may not be limited to the illustration of FIG. 2. For example, at least some of the modules illustrated in FIG. 2 may be expressed as one another module, and the modules illustrated in FIG. 2 may be expressed as a plurality of other modules and another module not illustrated in FIG. 2 may be further included in the module unit 265.

According to an embodiment, the AI module 260 may further include an accelerator for improving the speed of AI learning. According to various embodiments of the disclosure, the accelerator may include, for example, and without limitation, at least one of a graphics processing unit (GPU), a tensor processing unit (TPU), a neural processing unit (NPU), a vision processing unit (VPU), or the like.

A parameter learning module 271 may include various processing circuitry and/or executable program elements and generate the scheduling parameter using at least one AI learning model, by being executed by the processor 261. According to various embodiments, at least one AI learning model may include, for example, and without limitation, any one learning model of reinforcement learning, machine learning, continual learning, federated learning, deep learning, or the like.

According to an embodiment, the parameter learning module 271 may use at least one of the plurality of packets, the packet processing information, the BO, or the CIS, obtained from the data processor 210 through the AI communication module 274, as an input to the AI learning model. For example, the parameter learning module 271 may include, as the AI learning model, a reinforcement learning model, in which a state variable of the reinforcement learning model may include the plurality of packets, a compensation variable of the reinforcement learning model may include the packet processing information obtained by radio resource allocation to at least some of the plurality of packets, and a behavioral variable of the reinforcement learning model may include the calculated new scheduling parameter.

According to an embodiment, the parameter learning module 271 may derive a scheduling parameter leading to optimal packet processing information with respect to the plurality of packets, the BO, and the CSI, using the AI learning model. For example, the plurality of packets, the BO, and the CSI, which are obtained from the data processor 210, may be input to the AI learning model. The parameter learning model 271 may perform scheduling by applying scheduling methods (e.g., proportional fair scheduling, round-robin scheduling, max C/I scheduling, etc.) using the BO and the CSI to the plurality of packets, using the AI learning model. According to an embodiment, the parameter learning module 271 may derive a proper value of a scheduling parameter leading to optimal packet processing information with respect to the plurality of packets by applying various scheduling parameters using the AI learning model.

According to various embodiments, the parameter learning module 271 may derive a new scheduling parameter for various purposes based on the packet processing information. According to an embodiment, the parameter learning module 271 may derive a new scheduling parameter leading to maximum packet processing information, e.g., a maximum packet throughput for each UE. For example, the parameter learning module 271 may derive the scheduling parameter to further increase a and to further reduce β. In an embodiment of the disclosure, the parameter learning module 271 may derive a new scheduling parameter leading to minimum packet processing information, e.g., a minimum deviation of a packet throughput for each UE. For example, the parameter learning module 271 may derive the scheduling parameter to further reduce a and to further increase β. In various embodiments, the parameter learning module 271 may derive a new scheduling parameter to maximize a packet processing efficiency.

According to various embodiments of the disclosure, the parameter learning module 271 may repeat learning based on the plurality of packets, the BO, the CIS, the derived scheduling parameter, and the packet processing information. For example, the parameter learning module 271 may derive a scheduling parameter that optimizes the packet processing information based on the plurality of packets, the BO, and the CSI, and compare actually measured packet processing information with target packet processing information. According to an embodiment, the target packet processing information may be configured by a user, and may be configured based on the KPI required by the mobile communication network operators. The parameter learning module 271 may calculate a difference between measured packet processing information and target packet processing information and reflect the difference to the AI learning model, thereby repeating learning to reduce the difference. In various embodiments of the disclosure, when the parameter learning module 271 performs learning, it may be understood as being the same as or similar to training of the parameter learning module 271.

A condition determination module 272 may include various processing circuitry and/or executable program elements and determine a condition for delivering the new scheduling parameter derived from the parameter learning module 271 to the data processor 210, by being executed by the processor 261. For example, when the new scheduling parameter is derived from the parameter learning module 271 and a designated condition is satisfied, the condition determination module 272 may deliver the new scheduling parameter to the data processor 210. In another example, the condition determination module 272 may not deliver the new scheduling parameter to the data processor 210 when the designated condition is not satisfied even though the new scheduling parameter is derived from the parameter learning module 271.

According to an embodiment, the condition determination module 272 may calculate a performance indicator of the parameter learning module 271 based on the packet processing information obtained from the data processor 210, and determine whether the calculated performance indicator satisfies a designated condition. According to various embodiments of the disclosure, the performance indicator may include a difference or an accuracy that may be calculated by comparing the target packet processing information of the parameter learning module 271 with the packet processing information obtained from the data processor 210 or an evaluation indicator that may be calculated from the packet processing information. In an embodiment, the condition determination module 272 may determine that the new scheduling parameter is reliable and deliver the new scheduling parameter to the data processor 210, when the condition determination module 272 determines that the difference is less than a threshold value. In an embodiment of the disclosure, the condition determination module 272 may determine that the new scheduling parameter is reliable and deliver the new scheduling parameter to the data processor 210, when the condition determination module 272 determines that the accuracy is greater than a threshold value. According to an embodiment of the disclosure, the threshold value may be preset by the user.

According to an embodiment, the condition determination module 272 may determine whether a designated time elapses. For example, when the designated time elapses, the condition determination module 272 may deliver the new scheduling parameter to the data processor 210. According to an embodiment, the designated time may be preset by the user.

According to an embodiment, the condition determination module 272 may determine whether the current scheduling parameter is the same as the new scheduling parameter. For example, the new scheduling parameter derived from the parameter learning module 271 may be the same as the current scheduling parameter. In this case, the condition determination module 272 may not deliver the new scheduling parameter to the data processor 210. In another example, the new scheduling parameter derived from the parameter learning module 271 may be different from the current scheduling parameter. In this case, the condition determination module 272 may deliver the new scheduling parameter to the data processor 210.

According to an embodiment, the condition determination module 272 may determine a condition for delivering the new scheduling parameter to the data processor 210 based on a state of a network between the data processor 210 and the plurality of UEs. For example, the condition determination module 272 may obtain information about a network state, e.g., information about a delay level of the network or information about the amount of packets stacked in the queue, based on the packet processing information obtained from the data processor 210. In an embodiment, the condition determination module 272 may determine whether it is appropriate to update the scheduling parameter, based on the information about the network state. For example, the condition determination module 272 may not deliver the new scheduling parameter to the data processor 210 to restrain data transmission and reception between the data processor 210 and the AI module 260, when the delay level of the network is greater than or equal to the designated level. In another example, the condition determination module 272 may not deliver the new scheduling parameter to the data processor 210 not to add a load to the data processor 210, when the amount of packets stacked in the queue is greater than or equal to the designated level. In the foregoing embodiments of the disclosure, the data processor 210 may use the existing scheduling parameter without updating the same.

The condition learning module 273 may derive a threshold value or a designated time which is a determination criterion of the condition determination module 272 using at least one AI learning model, by being executed by the processor 261. According to an embodiment, the condition learning module 273 may derive a threshold value to be compared with a loss using at least one AI learning model, such that the threshold value is greater than or less than a current threshold value. For example, the condition learning model 273 may derive the threshold value to be compared with the loss such that the threshold value is greater than the current threshold value, when a data throughput is determined to be greater than a designated level, and may derive the threshold value to be compared with the loss such that the threshold value is less than the current threshold value, when a precision of data processing is lower than a designated level. In another example, the condition learning model 273 may derive the threshold value to be compared with the accuracy such that the threshold value is smaller than the current threshold value, when the data throughput is determined to be greater than the designated level, and may derive the threshold value to be compared with the accuracy such that the threshold value is greater than the current threshold value, when the precision of data processing is lower than the designated level. In another example, the condition learning model 273 may derive the designated time that is longer than an existing set time, when the data throughput is determined to be greater than the designated level, and may derive the designated time that is shorter than the existing set time, when the precision of data processing is lower than the designated level.

According to various embodiments, at least one AI learning model used by the condition learning module 273 may include any one of reinforcement learning, machine learning, continual learning, federated learning, and deep learning.

The AI communication module 274 may include various processing circuitry and/or executable program elements and transmit or receive data to or from the data processor 210, by being executed by the processor 261. For example, the AI communication module 274 may receive the plurality of packets, the CSI, the BO, or the packet processing information from the data processor 210. In another example, the AI communication module 274 may transmit a new scheduling parameter to a data processing module to update the scheduling parameter. According to various embodiments, the AI communication module 274 may receive at least one of the plurality of packets, the CSI, or the BO from the plurality of UEs.

Figure 3:
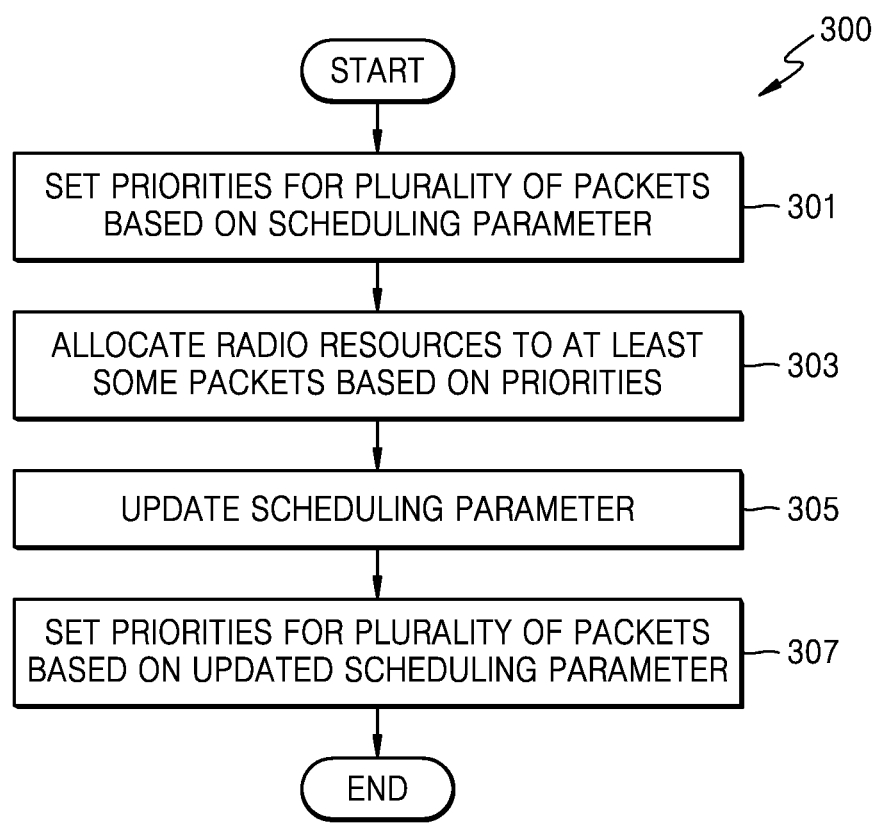
FIG. 3 is a flowchart illustrating an example method of scheduling a plurality of packets according to various embodiments.

FIG. 3 is a flowchart illustrating an example method of scheduling a plurality of packets according to various embodiments.

Referring to FIG. 3, a method 300, performed by an electronic device (e.g., the data processor 210 of FIG. 2) according to an embodiment, of scheduling a plurality of packets may include operations 301 through 307. In an embodiment, operations 301 through 307 may be performed by a processor (e.g., the processor 211 of FIG. 2) included in the electronic device. In various embodiments, the method, performed by the electronic device, of scheduling the plurality of packets may further include an operation not shown in FIG. 3, without being limited to the illustration of FIG. 3.

In operation 301, the electronic device may set priorities for a plurality of packets based on a scheduling parameter. For example, the electronic device may set the priorities for the plurality of packets stacked in the queue at a first point in time, based on the scheduling parameter. In an embodiment, the plurality of packets may include, for example, a packet obtained from each of a plurality of UEs (e.g., the plurality of UEs 120 of FIG. 1) prior to the first point in time, and each packet may, for example, be related to requesting, performed by the UE, a radio resource to provide a service to the user.

In an embodiment, the scheduling parameter may, for example, be a preset value in the electronic device, e.g., a value stored in a memory (e.g., the memory 214 of FIG. 2) of the electronic device by being input from the user or an outside. According to an embodiment, the scheduling parameter, which is a parameter related to a state or method of scheduling, may be understood as referring, for example, to a value indicating a weight value for criteria of scheduling. For example, the scheduling parameter may be configured for scheduling by applying a weight value to superiority and inferiority of a channel state or by applying a weight value to fair resource allocation to each of the plurality of UEs.

In operation 303, the electronic device may allocate radio resources to at least some of a plurality of packets for which priorities are set, based on the priorities set in operation 301. According to an embodiment, the amount of radio resources allocable during a unit time, e.g., a time corresponding to one slot, may be limited. The electronic device may allocate a radio resource to at least one packet in order from the highest priority to the lowest priority according to the amount of radio resources allocable during a unit time. In an embodiment of the disclosure, the packets allocated with the radio resources may be removed from the queue.

According to various embodiments, operations 301 through 303 may be repeated at least once or more. For example, the electronic device may further obtain the plurality of new packets at designated time intervals, and the plurality of packets may be stacked in the queue. The electronic device may reset the priorities for the plurality of packets stacked in the queue after the point in time at which operation 303 is performed, and allocate radio resources to the at least some packets based on the reset priorities.

In operation 305, the electronic device may update a scheduling parameter. According to an embodiment, the scheduling parameter may obtain an updated scheduling parameter from an AI module (e.g., the AI module 260 of FIG. 2). According to various embodiments, the AI module may derive a scheduling parameter leading to optimal packet processing information using at least one AI learning model, and the electronic device may update the scheduling parameter by obtaining the derived scheduling parameter from the AI module.

In operation 307, the electronic device may set priorities for a plurality of packets based on the scheduling parameter updated in operation 305. For example, the electronic device may set the priorities for the plurality of packets stacked in the queue at a second point in time temporally later than the first point in time, based on the scheduling parameter. In an embodiment of the disclosure, the plurality of packets may include a packet obtained from each of the plurality of UEs prior to the second point in time and a packet obtained from each of the plurality of UEs prior to the first point in time. According to an embodiment, the electronic device may allocate radio resources to at least some of the plurality of packets for which the priorities are set, based on the set priorities.

Figure 4:
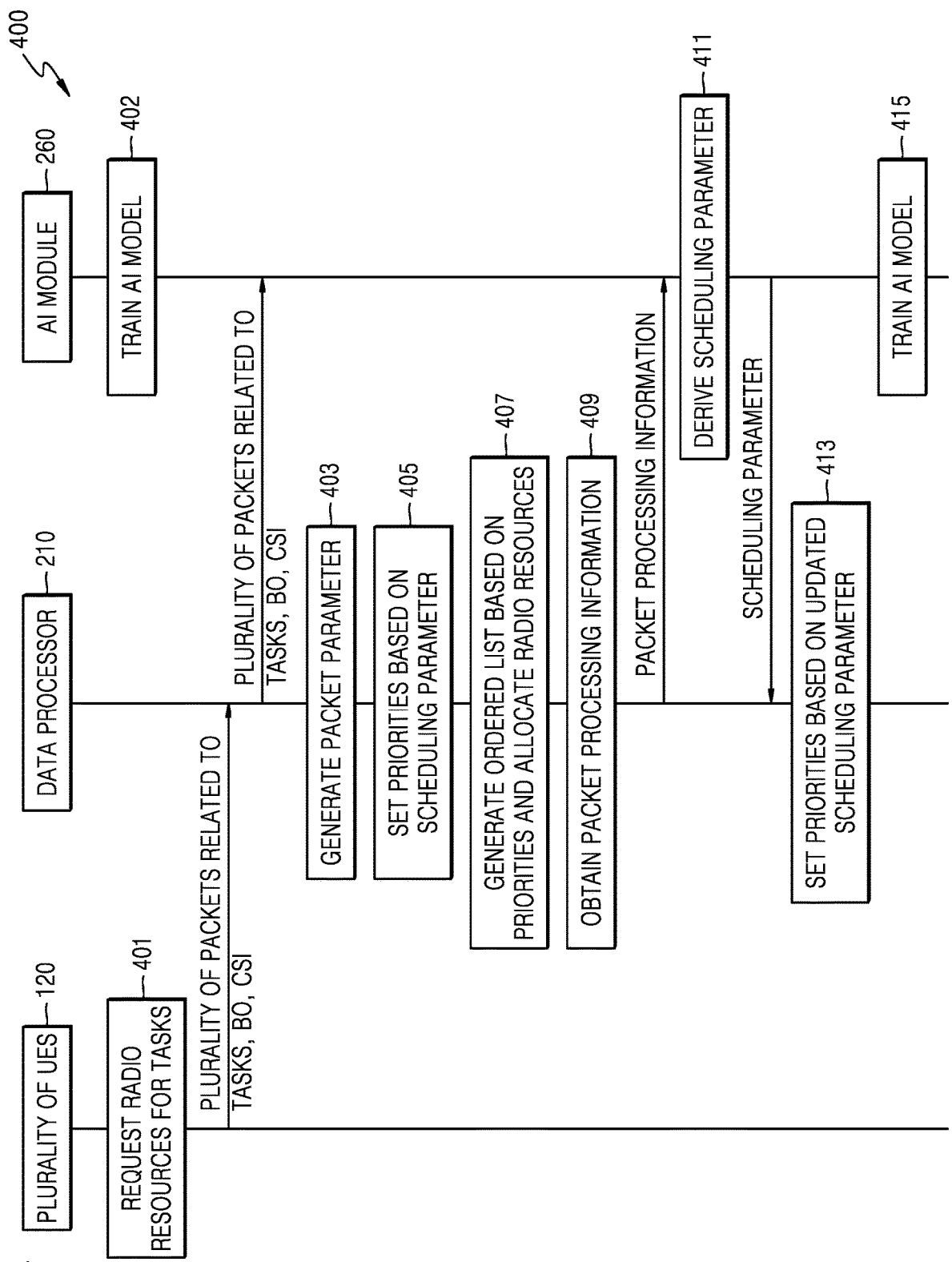
FIG. 4 is a signal flow diagram illustrating an example operation of an electronic device included in a communication system that schedules a plurality of packets, according to various embodiments.

FIG. 4 is a signal flow diagram illustrating an example operation of an electronic device included in a communication system that schedules a plurality of packets, according to various embodiments.

Referring to FIG. 4, a method 400, performed by electronic devices included in a communication system (the system 100 of FIG. 1 or the system 200 of FIG. 2), of scheduling a plurality of packets, according to an embodiment may include operations 401 through 415. In various embodiments, the method, performed by the electronic device, of scheduling the plurality of packets may further include an operation not shown in FIG. 4 or may omit at least one operation not shown in FIG. 4.

In operation 401, the plurality of UEs 120 may request radio resources for tasks to the data processor 210. For example, each of the plurality of UEs 120 may request radio resources for allowing a user to use the Internet, perform voice communication, or stream an image, or perform other various tasks.

According to an embodiment, when the plurality of UEs 120 request radio resources for tasks, a plurality of packets related to the tasks may be delivered to the data processor 210. Each packet may include information related to a radio resource requested to perform a task, e.g., the amount of radio resources required. According to an embodiment, when the plurality of UEs 120 request the radio resources for the tasks, CSI and/or a BO related to each UE may be delivered from the plurality of UEs 120 to the data processor 210.

In an embodiment, the CSI and the BO may be used as criteria for performing scheduling. For example, the data processor 210 may identify from the CSI, a level at which a channel state is good for each UE, and may perform scheduling such that a packet of a UE having a good channel state has a high priority. In another example, the data processor 210 may identify from the BO, a level at which a resource is allocated to each UE, and may perform scheduling such that a packet of a UE having a less resource allocation has a high priority.

According to an embodiment, when a plurality of packets are delivered to the data processor 210, the plurality of packets may be delivered from the data processor 210 to the AI module 260. According to an embodiment of the disclosure, when the CSI and/or the BO are delivered from the plurality of UEs 120 to the data processor 210, the CSI and/or the BO may be delivered from the data processor 210 to the AI module 260. In an embodiment of the disclosure, the plurality of packets, the CSI, or the BO delivered to the AI module 260 may be used for the AI module 260 to derive a proper scheduling parameter. For example, the plurality of packets, the CSI, or the BO may be input to the AI learning model included in the AI module 260 to derive a proper scheduling parameter.

In operation 402, the AI module 260 may train the AI learning model. According to an embodiment, operation 402 may be performed independently of operation 401. For example, the AI module 260 may perform an operation of training the AI learning model, regardless of whether the plurality of UEs 120 request radio resources. For example, operation 402 may be performed before or simultaneously with, or temporally after operation 401.

According to an embodiment, the AI module 260 may train the AI learning model using a plurality of packets, CSI, a BO, or packet processing information collected in the past. According to an embodiment of the disclosure, when a plurality of packets, CSI, or a BO is delivered from the data processor 210 as operation 401 is performed, the AI module 260 may train the AI learning model using the delivered plurality of packets, CSI, or BO, together with information collected in the past.

In operation 403, the data processor 210 may generate a packet parameter. The packet parameter, which may refer, for example, to a parameter determined for each packet, may include, for example, and without limitation, at least one of an MPR, a TBS, an RI, a QCI, parameters related to a priority of a packet, or the like.

In operation 405, the data processor 210 may set priorities for a plurality of packets stacked in a queue at the first point in time, based on a scheduling parameter. According to various embodiments, the scheduling parameter may be a preset value, e.g., a value stored in a memory (e.g., the memory 214 of FIG. 2) of the electronic device by being input from the user or an outside. In various embodiments, a method of setting a priority may use, for example, and without limitation, at least one of proportional fair scheduling, round-robin scheduling, max C/I scheduling, or the like.

In operation 407, the data processor 210 may generate an ordered list based on the priorities set in operation 405, and allocate radio resources to at least some packets. According to an embodiment, the ordered list may be understood as referring, for example, to a list of packets to which radio resources are allocable during a unit time, e.g., a time corresponding to one slot. According to various embodiments of the disclosure, the ordered list may include a designated number of packets or packets corresponding to a designated amount of radio resources.

According to an embodiment, the data processor 210 may allocate radio resources to packets included in the generated ordered list, and a task for the packets to which the radio resources are allocated may be provided to the user from a UE corresponding to each packet. In an embodiment, the packets allocated with the radio resources may be removed from the queue.

In operation 409, the data processor 210 may obtain packet processing information. According to an embodiment, the packet processing information, which may refer, for example, to information obtained as a result of operation 407, may be understood as referring, for example, to at least one of a packet throughput for all of a plurality of UEs, a packet throughput for each UE, a deviation of a packet throughput for each UE, a packet processing delay time, or other information collected to determine a packet processing efficiency. In an embodiment, the packet processing information may be related to the KPI of the mobile communication network operator.

According to an embodiment, when the packet processing information is obtained, the data processor 210 may deliver the packet processing information to the AI module 260. In an embodiment, the packet processing information delivered to the AI module 260 may be input to the AI learning model and may be used to derive a new scheduling parameter. For example, the delivered packet processing information may be used to calculate a performance indicator of the AI learning model by being compared with the target packet processing information of the AI learning model. As a difference between the delivered packet processing information and the target packet processing information is small, the accuracy or reliability of the AI learning model may be high and the reliability of the scheduling parameter derived by the AI learning model may also be high.

In operation 411, the AI module 260 may derive the scheduling parameter. According to an embodiment, the AI module 260 may train the AI learning model using the plurality of packets, the CSI, the BO, or the packet processing information obtained from the data processor 210, and may derive the new scheduling parameter using the trained AI learning model such that the packet processing information has an enhanced value.

According to an embodiment, when the AI module 260 derives the scheduling parameter, the AI module 260 may deliver the derived scheduling parameter to the data processor 210. According to various embodiments, the AI module 260 may deliver the derived scheduling parameter to the data processor 210, based on whether a specific condition is satisfied. For example, the AI module 260 may calculate a performance indicator of the AI learning model and compare the calculated performance indicator with a threshold value. The performance indicator may indicate a difference between the target packet processing information and the obtained packet processing information or the accuracy of the obtained packet processing information with respect to the target packet processing information. In an embodiment, when the performance indicator corresponds to a designated range, the scheduling parameter may be delivered to the data processor 210. In another example, the AI module 260 may determine whether a designated time elapses, and deliver the derived scheduling parameter to the data processor 210 upon the elapse of the designated time. In another example, the AI module 260 may determine whether a request message is obtained from the data processor 210, and deliver the derived scheduling parameter to the data processor 210 when the request message is obtained. According to an embodiment, the AI module 260 may determine whether the derived scheduling parameter is the same as an existing scheduling parameter, and deliver the derived scheduling parameter to the data processor 210 when they are different from each other. The foregoing example embodiments may be implemented separately or specific parts of characteristics of respective embodiments may be implemented in combination.

In operation 413, the data processor 210 may set the priorities for the plurality of packets stacked in the queue at the second point in time, based on the updated scheduling parameter. According to an embodiment, the data processor 210 may update the scheduling parameter based on the scheduling parameter delivered from the AI module 260 and set the priorities for the plurality of packets stacked in the queue at the second point in time based on the updated scheduling parameter. In an embodiment, the plurality of packets stacked in the queue at the second point in time may include packets to which radio resources are not allocated in operation 407, and packets obtained from each of the plurality of UEs prior to the second point in time. According to an embodiment, the data processor 210 may allocate radio resources to at least some of the plurality of packets for which the priorities are set, based on the set priorities.

In operation 415, the AI module 260 may train the AI learning model. According to an embodiment, the AI module 260 may perform an operation of training the AI learning model based on the operation of deriving and delivering the scheduling parameter being terminated.

Figure 5:
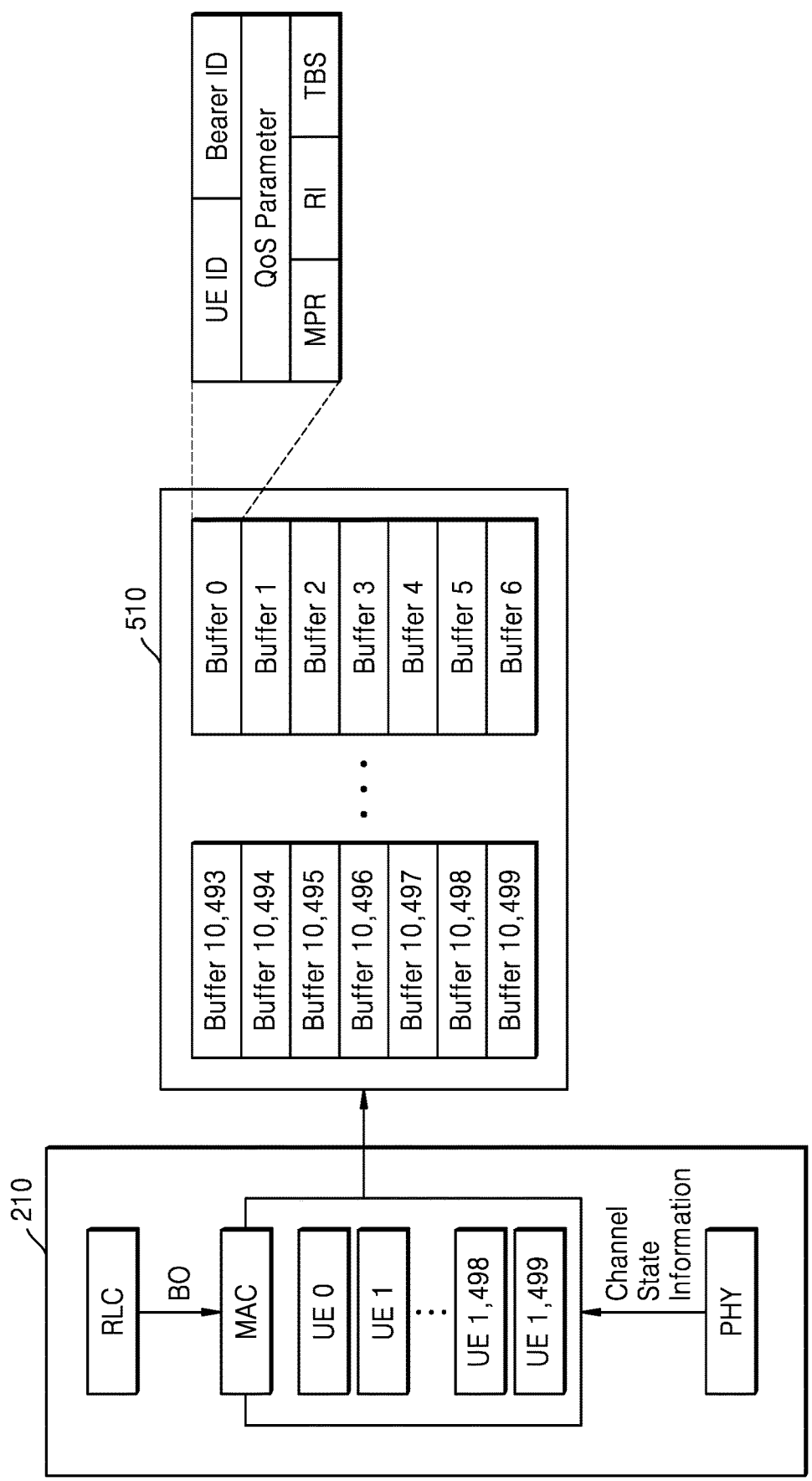
FIG. 5 is a diagram illustrating example buffers in which a plurality of packets are stored, according to various embodiments.

FIG. 5 is a diagram illustrating example buffers in which a plurality of packets are stored, according to various embodiments.

Referring to FIG. 5, the data processor 210 may include a physical (PHY) layer, a media access control (MAC) layer, and a radio link control (RLC) layer. In an embodiment, the PHY layer may refer, for example, to a layer in charge of direct data transmission and reception between the data processor 210 and a plurality of UEs (e.g., the plurality of UEs 120 of FIG. 1), in which the CSI obtained from the plurality of UEs may be delivered from the PHY layer to the MAC layer. In an embodiment, the RLC layer, which may refer, for example, to a layer for supporting reliable transmission of data, may deliver the BO obtained from the plurality of UEs from the RLC layer to the MAC layer. In an embodiment, the MAC layer may schedule the packets obtained from the plurality of UEs, using the CSI obtained from the PHY layer and the BO obtained from the RLC layer.

According to an embodiment, the data processor 210 may perform scheduling on the plurality of UEs, e.g., 1500 UEs, in the MAC layer, and each UE may be given an identification number from 0 to 1499. According to an embodiment, a designated number of bearers may exist for data transmission and reception between each UE and the data processor 210. In an embodiment, a bearer may be understood as referring, for example, to a carrier for data transmission, and data carried through the bearer, which may refer, for example, to a scheduling target in the MAC layer, may be understood as being the same as a packet herein. The number of bearers may be set differently according to a communication system. In an embodiment, a maximum of seven bearers may exist for each UE, and each bearer may be given an identification number from 0 to 6. However, it will be understood that the disclosure is not limited to this example.

According to an embodiment, data of bearers for the plurality of UEs may be stored in the form of a buffer, together with information about respective data. For example, when seven bearers exist for each of 1500 UEs, there may be 10500 buffers, each of which may be given an identification number from 0 to 10499. According to an embodiment, each of a plurality of buffers 510 may correspond to one bearer for one UE, and may include a plurality of components. For example, a buffer 0 may have components of an identification number of a UE, an identification number of a bearer in each UE, a QoS parameter, an MPR, an RI, or a TBS. According to various embodiments, at least one of the QoS parameter, the MPR, the RI, or the TBS may be used to determine a priority for each packet.

Figure 6:
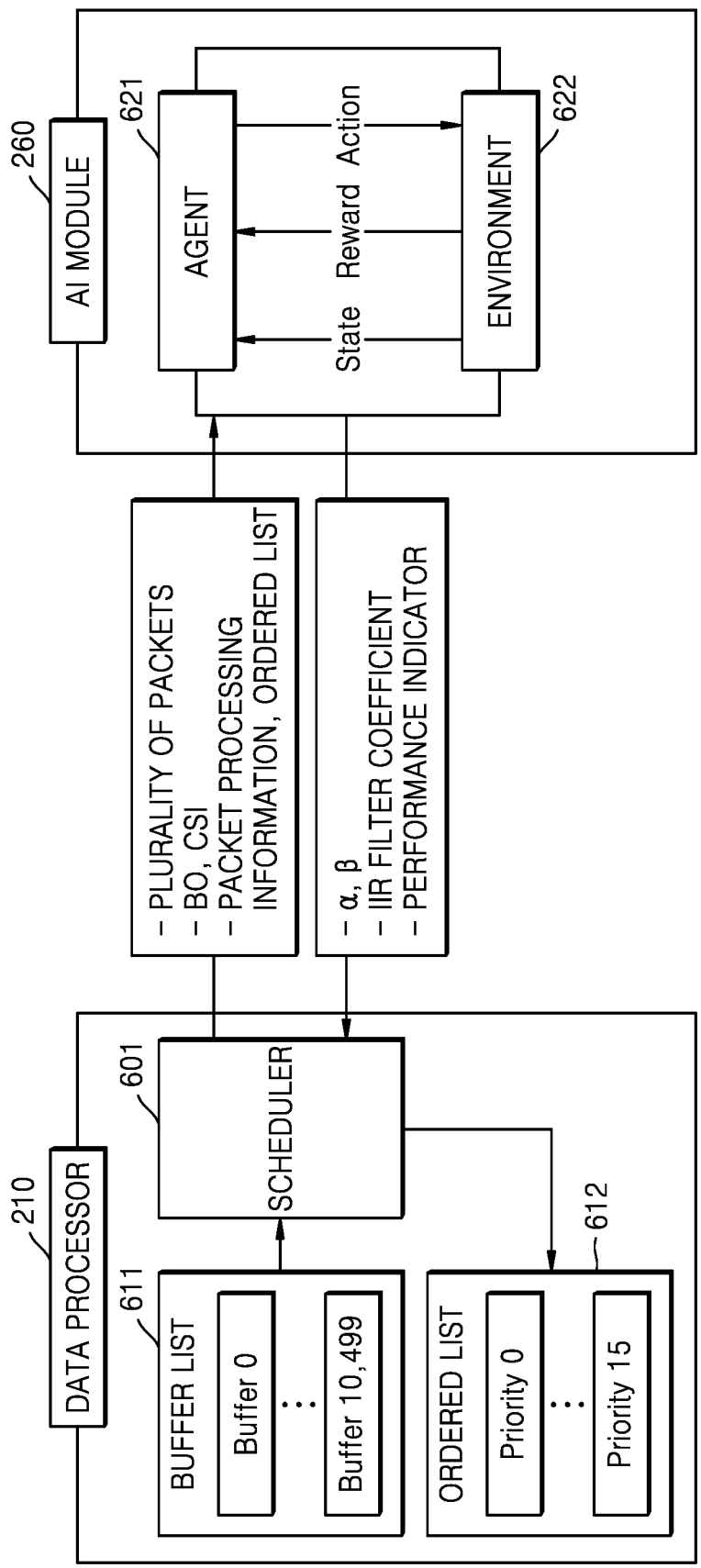
FIG. 6 is a block diagram illustrating an example data processor and an example artificial intelligence (AI) module configured to transmit and receive data to and from each other to schedule a plurality of packets related to tasks of a plurality of UEs, according to various embodiments.

FIG. 6 is a block diagram illustrating an example data processor and an AI module which transmit and/or receive data to and from each other to schedule a plurality of packets related to tasks of a plurality of UEs, according to various embodiments.

Referring to FIG. 6, the data processor 210 and the AI module 260 which schedule a plurality of packets related to tasks of a plurality of UEs (e.g., the plurality of UEs 120 of FIG. 1) may deliver a designated type of data therebetween. According to various embodiments, a type of data delivered between the data processor 210 and the AI module 260 may not be limited to the illustration of FIG. 6.

According to an embodiment, the data processor 210 may include a scheduler (e.g., including various processing circuitry and/or executable program elements) 610 for scheduling the plurality of packets related to the tasks of the plurality of UEs. According to various embodiments, the scheduler 601 may, for example, be understood as referring, for example, to the processor 211 or the scheduling module 232 shown in FIG. 2.

According to an embodiment, the scheduler 601 may obtain a plurality of buffers from a buffer list 611. In an embodiment, the buffer list 611 may be understood as referring, for example, to a queue in which buffers corresponding to the plurality of packets are stacked. Each of the plurality of buffers may include a packet related to the tasks or information related to the packet. For example, and without limitation, in each of the plurality of buffers, as described with reference to FIG. 5, at least one of an identification number of a UE, an identification number of a bearer in each UE, a QoS parameter, an MPR, an RI, or a TBS may be stored. According to an embodiment of the disclosure, the scheduler 601 may obtain information obtained from the plurality of UEs, e.g., a BO or CSI from the buffer list 611.

According to an embodiment, the scheduler 601 may schedule the plurality of packets and generate an ordered list

612 based on priorities. According to an embodiment, the ordered list 612 may be understood as referring, for example, to a list of packets to which radio resources are allocable during a unit time, e.g., a time corresponding to one slot. According to various embodiments, the ordered list 612 may include a designated number of packets or packets corresponding to a designated amount of radio resources. According to an embodiment, the scheduler 601 may allocate radio resources to the packets included in the ordered list 612.

According to an embodiment, the scheduler 601 may deliver at least some of data obtained from the plurality of UEs or data produced through scheduling to the AI module 260. For example, the scheduler 601 may deliver at least one of the plurality of packets obtained from the plurality of UEs, the BO, the CSI, the packet processing information, or the ordered list 612 to the AI module 260.

According to an embodiment, the AI module 260 may include at least one AI learning model that may correspond to a model trained by reinforcement learning including an agent (e.g., including processing circuitry and/or executable program elements) 621 and an environment 622. The agent 621 may be understood as referring, for example, to a virtual entity having an ability of recognizing the environment 622, and the agent 621 may include, for example, an entity that obtains a state and a reward for the past action from the environment 622 and measures a proper action to the environment 622.

According to an embodiment, at least some of data delivered from the data processor 210 to the AI module 260 may be input to the AI learning model. For example, the plurality of packets delivered from the data processor 210 may be input as the state to the environment 622 of the AI learning model. In another example, the packet processing information delivered from the data processor 210 may be input as the reward to the environment 622 of the AI learning model.

According to an embodiment, the AI learning model may be trained, and the proper action may be derived using data input as the state or the reward to the environment 622. For example, the AI learning model may be trained by repeating scheduling using the BO or the CSI, and the AI learning model may derive a new scheduling parameter, as an action that maximizes the reward.

According to an embodiment, the AI module 260 may evaluate the reliability of the trained AI learning model. For example, the AI module 260 may obtain the performance indicator of the AI learning model by comparing a target value or a predicted value with an actually obtained value through the AI learning model. In various embodiments, the performance indicator may include a difference between the target packet processing information and the obtained packet processing information or the accuracy of the obtained packet processing information with respect to the target packet processing information.

According to an embodiment, the AI module 260 may deliver at least a part of data produced from the AI learning model to the data processor 210. For example, the AI module 260 may deliver, as a new scheduling parameter, at least one of a, 13, or an IIR filter coefficient to the data processor 210. In another example, the AI module 260 may deliver the performance indicator, e.g., a difference between the target packet processing information and the obtained packet processing information or the accuracy of the obtained packet processing information with respect to the target packet processing information, to the data processor 210. In an embodiment of the disclosure, the performance indicator may be used to determine whether to apply the new scheduling parameter.

According to an embodiment, at least some of data delivered from the AI module 260 to the data processor 210 may be used to schedule the plurality of packets. For example, the new scheduling parameter delivered from the AI module 260 may be used to update an existing scheduling parameter of the data processor 210. The data processor 210 may schedule the plurality of packets based on the updated scheduling parameter.

Figure 7:
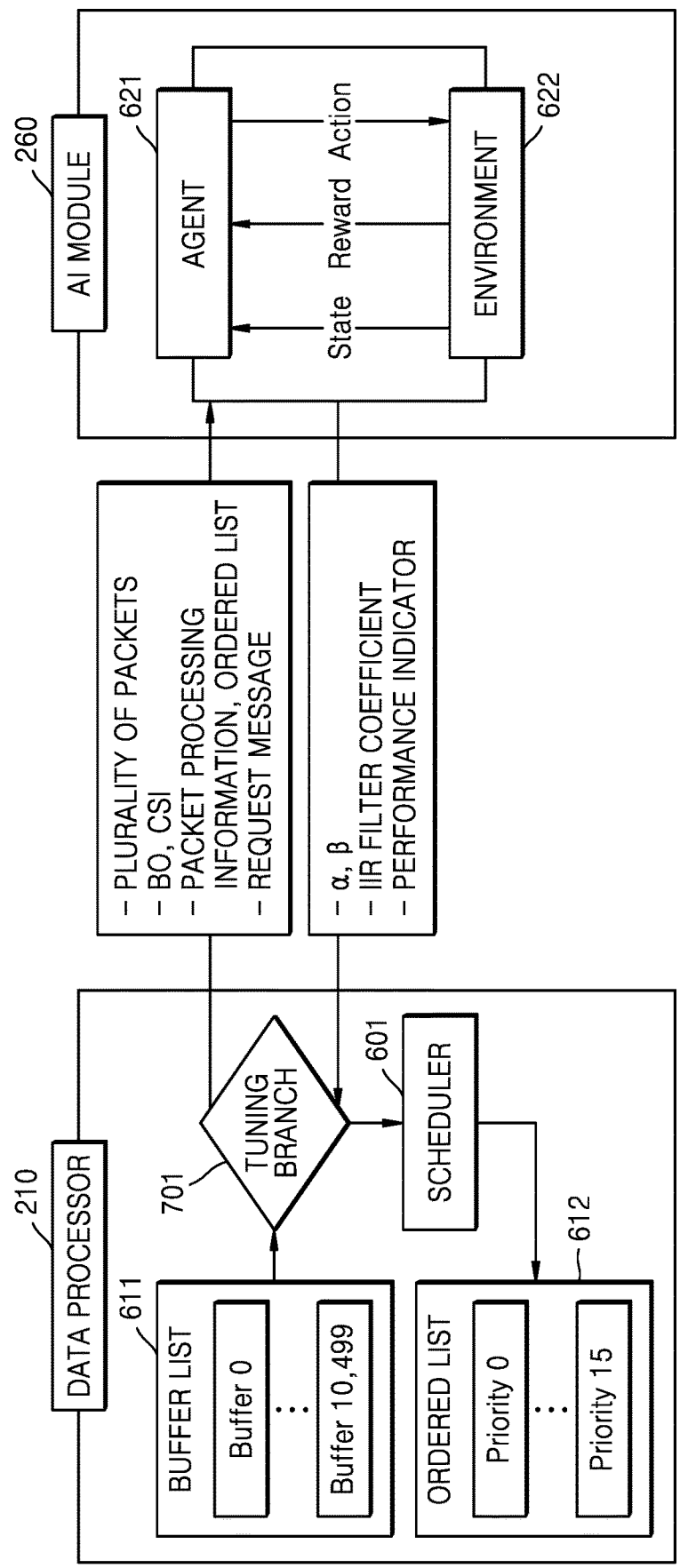
FIG. 7 is a block diagram illustrating an example data processor and an example AI module configured to transmit and receive data to and from each other to schedule a plurality of packets related to tasks of a plurality of UEs, according to various embodiments.

FIG. 7 is a block diagram illustrating an example data processor and an AI module which transmit and/or receive data to and from each other to schedule a plurality of packets related to tasks of a plurality of UEs, according to various embodiments.

Referring to FIG. 7, the data processor 210 and the AI module 260 which schedule a plurality of packets related to tasks of a plurality of UEs (e.g., the plurality of UEs 120 of FIG. 1) may deliver a designated type of data therebetween. According to various embodiments, a type of data delivered between the data processor 210 and the AI module 260 may not be limited to the illustration of FIG. 7. According to various embodiments, a corresponding description may be applied identically or similarly to reference numerals of components illustrated in FIGS. 2 through 6 among components illustrated in FIG. 7 and components having the same reference numerals.

According to an embodiment, the data processor 210 may include the scheduler 601 and a tuning branch 701 which schedule the plurality of packets related to the tasks of the plurality of UEs. The tuning branch 701 may be understood as referring, for example, to a component included in the processor 211 illustrated in FIG. 2, and/or as a separate additional module. In various embodiments, the tuning branch 701 may perform at least a part of an operation of the scheduler 601 illustrated in FIG. 6. For example, the tuning branch 701 may deliver data to the AI module 260 or obtain data from the AI module 260.

According to an embodiment, the tuning branch 701 may deliver at least some of data obtained from the plurality of UEs or data produced through scheduling to the AI module 260. For example, the tuning branch 701 may deliver at least one of the plurality of packets obtained from the plurality of UEs, the BO, the CSI, the packet processing information, or the ordered list 612 to the AI module 260.

According to an embodiment, when a designated condition is satisfied, e.g., the reliability of the AI learning model is determined to be greater than or equal to a designated level, the tuning branch 701 may deliver a request message to the AI module 260. In an embodiment, the request message may be a message actively requesting a new scheduling parameter to the AI module 260.

According to an embodiment, the tuning branch 701 may obtain the performance indicator of the AI learning model from the AI module 260. For example, the AI module 260 may deliver the performance indicator to the data processor 210 periodically at designated time intervals, and the tuning branch 701 may obtain the performance indicator periodically at designated time intervals. According to an embodiment, the turning branch 701 may determine whether the obtained performance indicator satisfies a designated range. For example, the tuning branch 701 may determine from the obtained performance indicator whether the accuracy of the AI learning model is greater than or equal to a designated level or the difference of the AI learning model is less than or equal to a designated level.

In an embodiment, when the tuning branch 701 determines that the obtained performance indicator satisfies the designated range, the tuning branch 701 may determine that the reliability of the AI learning model is greater than or equal to the designated level, and may deliver a request message requesting a new scheduling parameter derived from the AI learning model to the AI module 260. In an embodiment, the AI module 260 may deliver the derived new scheduling parameter to the data processor 210 in response to reception of the request message from the data processor 210. The data processor 210 may update the scheduling parameter by obtaining the new scheduling parameter.

Figure 8:
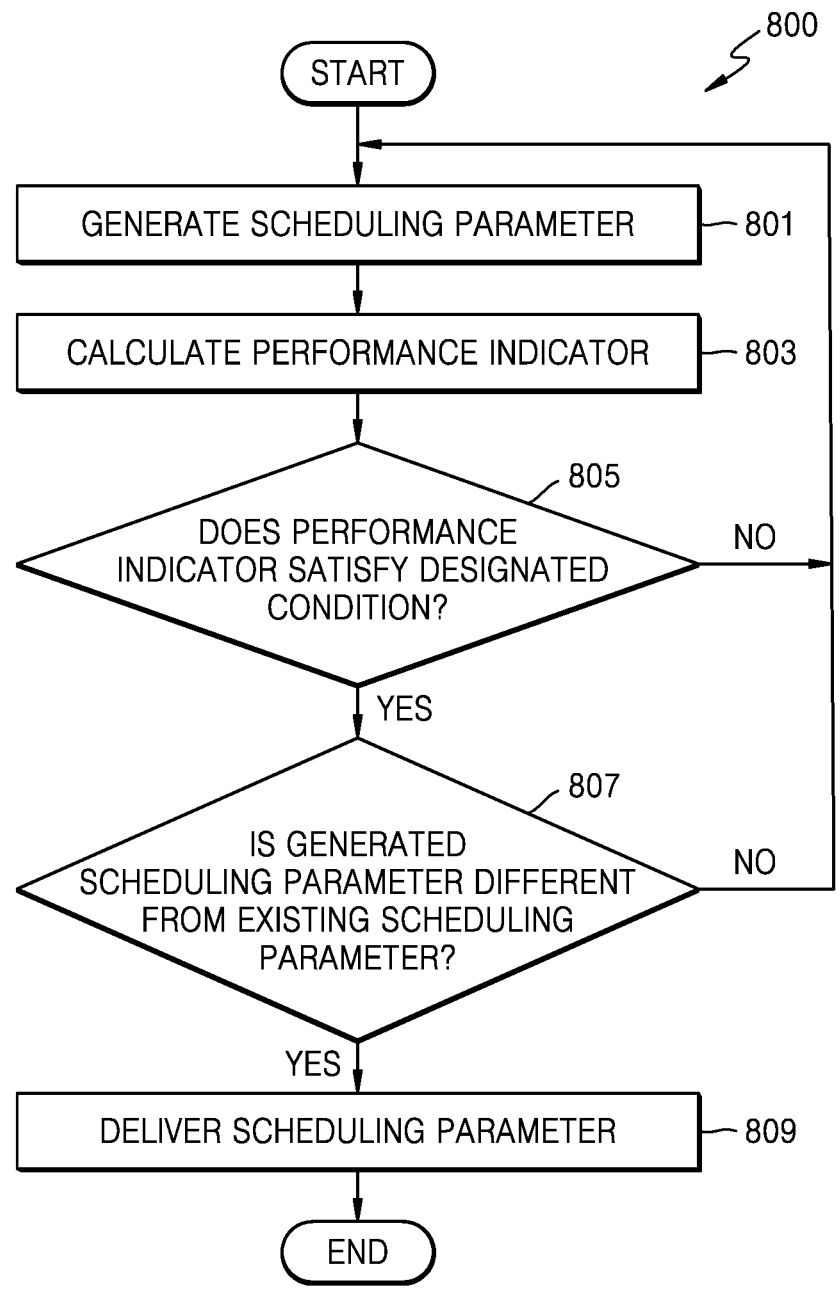
FIG. 8 is a flowchart illustrating an example method, performed by an AI module, of delivering a scheduling parameter to a data processor, according to various embodiments.

FIG. 8 is a flowchart illustrating an example method, performed by an AI module, of delivering a scheduling parameter to a data processor, according to various embodiments.

Referring to FIG. 8, a method 800, performed by an AI module (e.g., the AI module 260 of FIG. 2) according to an embodiment, of delivering a scheduling parameter to a data processor (e.g., the data processor 210 of FIG. 2) may include operations 801 through 809. In an embodiment, operations 801 through 809 may be performed by a processor (e.g., the processor 261 of FIG. 2) included in the AI module. According to various embodiments, the method of delivering the scheduling parameter may further include an operation not shown in FIG. 8 without being limited the illustration of FIG. 8, or may omit at least one of operations shown in FIG. 8.

In operation 801, the AI module may generate a scheduling parameter. For example, the AI module may generate a scheduling parameter corresponding to an improved value of packet processing information, using at least one AI learning model.

In operation 803, the AI module may calculate a performance indicator. The performance indicator may be understood as referring, for example, to an indicator related to the reliability of the AI learning model, and may be calculated as a difference between packet processing information predicted in the AI learning model and packet processing information obtained from the data processor.

According to an embodiment, the performance indicator may be calculated based on a packet throughput for all of the plurality of UEs in the packet processing information. For example, the AI module may calculate as the performance indicator, a difference between a predicted packet throughput for all of the plurality of UEs and an actual packet throughput. According to an embodiment of the disclosure, the performance indicator may be calculated based on a packet throughput for each UE in the packet processing information. For example, the AI module may calculate as the performance indicator, for example, and without limitation, a mean square or a root mean square of differences between a predicted packet throughput and an actual packet throughput for each UE. According to an embodiment of the disclosure, the performance indicator may be calculated based on a standard deviation of a packet throughput for each UE in the packet processing information. For example, the AI module may calculate as the performance indicator, a difference between a predicted value of and an actual value of a standard deviation of a packet throughput for each UE.

In operation 805, the AI module may determine whether the performance indicator satisfies a designated condition. According to various embodiments, the performance indicator may, for example, and without limitation, be any one of a difference between a predicted packet throughput and an actual packet throughput for all of the plurality of UEs, a mean square or a root mean square of differences between a predicted value of and reliability an actual value of a packet throughput for each UE, or a difference between a predicted value of and an actual value of a standard deviation of a packet throughput for each UE. According to various embodiments, when the AI module determines that the performance indicator calculated as a difference between the predicted value and the actual value is less than a threshold value ("Yes" in operation 805), the AI module may determine that a new scheduling parameter is reliable and perform operation 807. According to various embodiments, when the AI module does not determine that the performance indicator calculated as the difference between the predicted value and the actual value is less than the threshold value ("No" in operation 805), the AI module may return to operation 801 and perform the operation of generating a scheduling parameter again.

In operation 807, the AI module may determine whether the generated scheduling parameter has a value that is different from that of the existing scheduling parameter. In an embodiment, when the AI module determines that the newly generated scheduling parameter has a value that is different from that of the existing scheduling parameter ("Yes" in operation 807), the AI module may perform operation 809. In an embodiment, when the AI module determines that the newly generated scheduling parameter has a value that is the same as that of the existing scheduling parameter ("No" in operation 807), the AI module does not need to deliver the scheduling parameter and thus return to operation 801 to perform the operation of generating the scheduling parameter again. Herein, an embodiment has been described in which operation 807 is performed after operation 805, but operation 807 may be performed before or simultaneously with operation 805.

In operation 809, the AI module may deliver the generated scheduling parameter to the data processor. The delivered scheduling parameter may update the existing scheduling parameter in the data processor.

Figure 9:
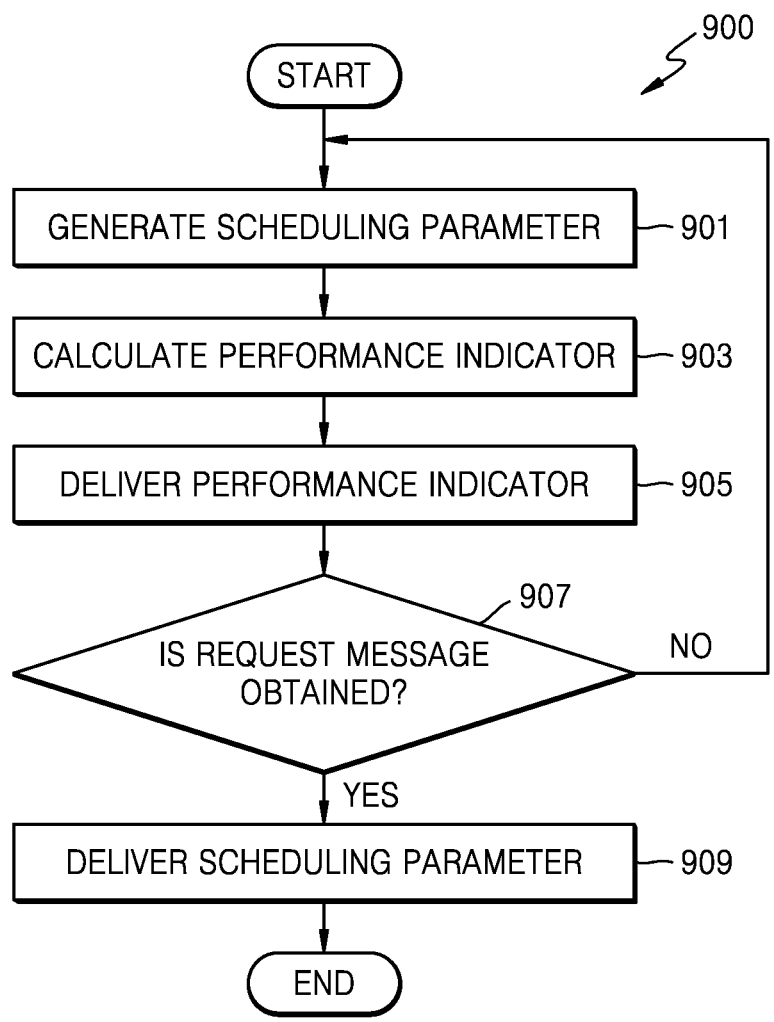
FIG. 9 is a flowchart illustrating an example method, performed by an AI module, of delivering a scheduling parameter to a data processor, according to various embodiments of the disclosure.

FIG. 9 is a flowchart illustrating an example method, performed by an AI module, of delivering a scheduling parameter to a data processor, according to various embodiments.

Referring to FIG. 9, a method 900, performed by an AI module (e.g., the AI module 260 of FIG. 2) according to an embodiment, of delivering a scheduling parameter to a data processor (e.g., the data processor 210 of FIG. 2) may include operations 901 through 909. In an embodiment of the disclosure, operations 901 through 909 may be performed by a processor (e.g., the processor 261 of FIG. 2) included in the AI module. According to various embodiments, the method of delivering the scheduling parameter may further include an operation not shown in FIG. 9 without being limited the illustration of FIG. 9, or may omit at least one of operations shown in FIG. 9.

According to various embodiments, operations 901, 903, and 909 may be the same as or similar to operations 801, 803, and 809, respectively. The description of operations 801, 803, and 809 shown in FIG. 8 may be applied identically or similarly to operations 901, 903, and 909.

In operation 905, the AI module may deliver a performance indicator to the data processor. According to various embodiments, the performance indicator delivered to the data processor may be determined whether to satisfy a designated condition by a tuning branch (e.g., the tuning branch 701 of FIG. 7) of the data processor. In various embodiments, when the performance indicator is determined to be less than a threshold value by the tuning branch, the tuning branch may deliver a request message to the AI module. In various embodiments, when the performance indicator is not determined to be less than the threshold value, the tuning branch may not deliver the request message to the AI module.

In operation 907, the AI module may determine whether the request message is obtained from the data processor. In various embodiments, the AI module may perform operation 909 when the request message is obtained, and return to operation 901 to perform again the operation of generating the scheduling parameter when the request message is not obtained.

In operation 909, the scheduling parameter may be delivered from the AI module to the data processor, and it may be determined whether the delivered scheduling parameter has a value that is different from the existing scheduling parameter. When it is determined that the delivered scheduling parameter has a value that is different from the existing scheduling parameter in the data processor, the existing scheduling parameter may be updated with a value of the delivered scheduling parameter in the data processor.

According to an example embodiment, a method, performed by an electronic device, of scheduling a plurality of packets to allocate radio resources to a plurality of packets related to tasks of a plurality of user equipments (UEs) and stacked in a queue may include: setting priorities for a plurality of packets stacked in the queue at a first point in time based on a preset scheduling parameter, allocating radio resources to at least some of the plurality of packets for which the priorities are set based on the set priorities, updating the scheduling parameter using at least one artificial intelligence (AI) learning model, and setting the priorities for the plurality of packets stacked in the queue at a second point in time later than the first point in time, based on the updated scheduling parameter.

According to an example embodiment, the method may further include obtaining packet processing information as a result of the allocating of the radio resources to the at least some of the plurality of packets for which the priorities are set, in which the packet processing information is input to the at least one AI learning model to update the scheduling parameter.

According to an example embodiment, the method may further include obtaining a buffer occupancy (BO) for each of the plurality of UEs and channel state information (CSI) for each UE, from the plurality of UEs.

In an example embodiment, the method may further include: generating packet parameters related to each of the plurality of packets stacked in the queue at the first point in time based on the obtained BO and the obtained CSI, in which the priorities for the plurality of packets stacked in the queue at the first point in time are set based on the packet parameter and the scheduling parameter.

In an example embodiment of the disclosure, the packet parameter may include at least one of a modulation order product code rate (MPR) or a transport block size (TBS).

In an example embodiment of the disclosure, the obtained BO and the obtained CSI may be input to the at least one AI learning model to update the scheduling parameter.

In an example embodiment of the disclosure, the updating of the scheduling parameter may include changing the scheduling parameter based on a performance indicator calculated based on the obtained packet processing information satisfying a designated condition, and maintaining the scheduling parameter based on the calculated performance indicator not satisfying the designated condition.

According to an example embodiment, the updating of the scheduling parameter may include updating the scheduling parameter based on a preset time elapsing.

According to an example embodiment, the at least one AI learning model may include at least one of reinforcement learning, machine learning, continual learning, federated learning, and deep learning.

According to an example embodiment, the at least one AI learning model may include a model trained through reinforcement learning, a state variable of the reinforcement learning may include the plurality of packets, a reward variable of the reinforcement learning may include packet processing information obtained as a result of the allocating of the radio resources to the at least some of the plurality of packets, and an action variable of the reinforcement learning may include the updated scheduling parameter.

According to an example embodiment, the scheduling parameter may include any one of proportional fair scheduling, round-robin scheduling, and max carrier to interference (C/I) scheduling.

According to an example embodiment, an electronic device configured to schedule a plurality of packets to allocate radio resources to a plurality of packets related to tasks of a plurality of user equipments (UEs) and stacked in a queue may include: at least one processor and a memory connected to the at least one processor and storing a scheduling parameter, wherein the at least one processor is configured to: set priorities for a plurality of packets stacked in the queue at a first point in time based on a preset scheduling parameter, allocate radio resources to at least some of the plurality of packets for which the priorities are set based on the set priorities, obtain a scheduling parameter updated using at least one artificial intelligence (AI) learning model, and set the priorities for the plurality of packets stacked in the queue at a second point in time later than the first point in time, based on the updated scheduling parameter.

According to an example embodiment, the at least one processor may be further configured to: obtain packet processing information as a result of allocating the radio resources to the at least some of the plurality of packets for which the priorities are set and deliver the obtained packet processing information to an AI module including the at least one AI learning model such that the obtained packet processing information is input to the at least one AI learning model.

In an example embodiment, the at least one processor may be further configured to: obtain a buffer occupancy (BO) for each of the plurality of UEs and channel state information (CSI) for each UE, from the plurality of UEs.

In an example embodiment, the at least one processor may be further configured to: generate packet parameters related to each of the plurality of packets stacked in the queue at the first point in time based on the obtained BO and the obtained CSI, wherein the priorities for the plurality of packets stacked in the queue at the first point in time are set based on the packet parameter and the scheduling parameter.

In an example embodiment, the at least one processor may be further configured to: deliver the obtained BO and the obtained CSI to an AI module including the at least one AI learning model such that the obtained BO and the obtained CSI are input to the at least one AI learning model.

According to an example embodiment, the at least one AI learning model may include at least one of reinforcement learning, machine learning, continual learning, federated learning, and deep learning.

According to an example embodiment, the at least one AI learning model may include a model trained through reinforcement learning, a state variable of the reinforcement learning may include the plurality of packets, a reward variable of the reinforcement learning may include packet processing information obtained as a result of allocating the radio resources to the at least some of the plurality of packets, and an action variable of the reinforcement learning may include the updated scheduling parameter.

According to an example embodiment, the scheduling parameter may be related to at least one of proportional fair scheduling, round-robin scheduling, and max carrier to interference (C/I) scheduling.

According to an embodiment of the disclosure, a system configured to schedule a plurality of packets to allocate radio resources to a plurality of packets related to tasks of a plurality of user equipments (UEs) and stacked in a queue includes: an artificial intelligence (AI) module including at least one AI learning model and a data processor configured to: set priorities for a plurality of packets stacked in the queue at a first point in time based on a preset scheduling parameter, allocate radio resources to at least some of the plurality of packets for which the priorities are set based on the set priorities, obtain a scheduling parameter updated using at least one artificial intelligence (AI) learning model, from the AI module, and set the priorities for the plurality of packets stacked in the queue at a second point in time later than the first point in time, based on the updated scheduling parameter, wherein the AI module is configured to: obtain from the data processor, packet processing information as a result of allocating the radio resources to the at least some of the plurality of packets for which the priorities are set, generate the updated scheduling parameter based on the obtained packet processing information, using the at least one AI learning model, and deliver the updated scheduling parameter to the data processor.

It should be appreciated that various example embodiments of the disclosure and the terms used therein are not intended to limit the technological features set forth herein to particular embodiments of the disclosure and include various changes, equivalents, or replacements for a corresponding embodiment of the disclosure. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various components regardless of order and/or importance and do not limit corresponding components. When it is described that a component (such as a first component) is "operatively or communicatively coupled with/to" or "connected" to another component (such as a second component), the component can be directly connected to the other component or can be connected to the other component through another component (e.g., a third component).

A term "module" used herein may refer, for example, to a unit including one of or a combination of two or more of hardware, software, and firmware, or any combination thereof, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments of the disclosure as set forth herein may be implemented as software including one or more instructions that are stored in a storage medium (e.g., internal memory or external memory) that is readable by a machine (e.g., a computer). The machine may invoke stored instructions from the storage medium and operate according to the invoked instructions, and may include an electronic device according to the disclosed embodiments of the disclosure. When the instructions are executed by a processor, functions corresponding to the instructions may be performed directly by the processor, or by other components under control by the processor. The one or more instructions may include a code generated by a compiler or a code executable by an interpreter. The machine-readable storage medium may be provided in the form of a non-transitory storage medium. Wherein, the "non-transitory" storage medium is a tangible device, and may not include a transitory electrical signal, but this term does not distinguish between where data is semi-permanently stored in the storage medium and where the data is temporarily stored in the storage medium.

According to an embodiment of the disclosure, a method according to various embodiments of the disclosure disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). When distributed online, at least part of the computer program product may be temporarily generated or at least temporarily stored in the machine-readable storage medium, such as memory of a manufacturer's server, a server of the application store, or a relay server.

Each component (e.g., a module or a program) according to various embodiments of the disclosure may include a single entity or multiple entities, and some of the above-described sub components may be omitted, or other sub components may be further included in various embodiments of the disclosure. Alternatively or additionally, some components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments of the disclosure may be carried out sequentially, in parallel, repeatedly, or heuristically, or one or more of the operations may be executed in a different order or omitted, or one or more other operations may be added.

A function related to AI according to the disclosure may be performed through a processor and a memory. The processor may include one processor or a plurality of processors. In this case, one processor or a plurality of processors may include a general-purpose processor such as a CPU, an application processor (AP), a digital signal processor (DSP), etc., a graphic-dedicated processor such as a GPU, a vision processing unit (VPU), etc., and an AI-dedicated processor such as a neural processing Unit (NPU). One processor or a plurality of processors may control data to be processed according to a predefined operation rule or AI model stored in the memory. When one processor or a plurality of processors include an AI-dedicated processor, the AI-dedicated processor may be designed as a hardware structure specialized for processing a specific AI model.

The predefined operation rule or AI model may be made through training. Herein, when the predefined operation rule or AI model is made through training, it may refer, for example, to a basic AI model being trained based on a learning algorithm using multiple training data, such that the predefined operation rule or AI model set to execute desired characteristics (or purpose) is made. Such learning may be performed by a device on which AI according to the disclosure is implemented, or by a separate server and/or system. Examples of a learning algorithm may include, but not limited to, supervised learning, unsupervised learning, semi-supervised learning, or reinforcement learning.

An AI model may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process. Examples of the AI neural network may include, but not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network.

In the method, performed by the electronic device, of scheduling a plurality of packets according to the disclosure, an AI model may be used as a method of reasoning or predicting a scheduling parameter to optimize packet processing information indicating a result of allocation of radio resources to the plurality of packets using the plurality of packets, a BO, or CSI. The processor may convert the data into a form that is appropriate for use as an input to the AI model, by performing preprocessing on the data. The AI model may be made through training. Herein, when the AI model is made through training, it may refer, for example, to a basic AI model being trained based on a learning algorithm using multiple training data, such that the predefined operation rule or AI model set to execute desired characteristics (or purpose) is made. The AI model may include a plurality of neural network layers. Each of the plurality of neural network layers may have a plurality of weight values, and perform a neural network operation through an operation between an operation result of a previous layer and the plurality of weight values.

Reasoning/prediction may refer, for example, to technology for determining information and executing logical reasoning and prediction and include knowledge/probability-based reasoning, optimization prediction, preference-based planning, recommendation, etc.

According to various example embodiments disclosed herein, the parameters used in the method of scheduling the plurality of packets related to the tasks of the plurality of UEs may be adaptively updated, thereby saving a time and a labor force required for setting or periodically changing the parameters. Moreover, the parameters may be adjusted by AI according to a purpose, thereby efficiently performing allocation of the radio resources to the plurality of UEs.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method, performed by an electronic device, of scheduling a plurality of packets to allocate radio resources to a plurality of packets related to tasks of a plurality of user equipments (UEs) and stacked in a queue, the method comprising:

setting, for each packet of the plurality of packets related to the tasks of the UEs and stacked in the queue at a first point in time, a priority in the queue based on a packet parameter of the packet for which the priority is being set and a scheduling parameter, wherein the scheduling parameter distinguished from the packet parameter, configured according to a state and/or method of scheduling, updated to a new parameter having an improved scheduling processing state based on a scheduling processing state, and indicating a weight of criteria used in scheduling packets in the queue, the criteria including a channel state of each of the plurality of UEs and/or a resource allocation to each of the plurality of UEs;

allocating, based on the priorities set for the plurality of packets stacked in the queue at the first point in time, radio resources to at least some of the plurality of packets in the queue at the first point in time for which the priorities are set;

updating the scheduling parameter using at least one artificial intelligence (AI) learning model;

setting, for each packet of a plurality of packets stacked in the queue at a second point in time later than the first point in time, a priority in the queue based on a packet parameter of the packet for which the priority is being set and the updated scheduling parameter; and allocating, based on the priorities set for the plurality of packets stacked in the queue at the second point in time, radio resources to at least some of the plurality of packets stacked in the queue at the second point in time and for which the priorities are set.

2. The method of claim 1, further comprising: obtaining packet processing information based on the allocating of the radio resources to the at least some of the plurality of packets for which the priorities are set at the first point in time, wherein the packet processing information is input to the at least one AI learning model to update the scheduling parameter.

3. The method of claim 1, further comprising: obtaining a buffer occupancy (BO) for each of the plurality of UEs and channel state information (CSI) for each UE, from the plurality of UEs.

4. The method of claim 3, further comprising: generating packet parameters related to each of the plurality of packets stacked in the queue at the first point in time based on the obtained BO and the obtained CSI, wherein the priorities for the plurality of packets stacked in the queue at the first point in time are set based on the packet parameter and the scheduling parameter.

5. The method of claim 4, wherein the packet parameter comprises at least one of a modulation order product code rate (MPR) or a transport block size (TBS).

6. The method of claim 3, wherein the obtained BO and the obtained CSI are input to the at least one AI learning model to update the scheduling parameter.

7. The method of claim 2, wherein the updating of the scheduling parameter comprises: changing the scheduling parameter based on a performance indicator calculated based on the obtained packet processing information satisfying a designated condition, and maintaining the scheduling parameter based on the calculated performance indicator not satisfying the designated condition.

8. The method of claim 1, wherein the updating of the scheduling parameter comprises updating the scheduling parameter based on a preset time elapsing.

9. The method of claim 1, wherein the at least one AI learning model comprises at least one of reinforcement learning, machine learning, continual learning, federated learning, and deep learning.

10. The method of claim 1, wherein the at least one AI learning model includes a model trained through reinforcement learning,
 a state variable of the reinforcement learning comprises the plurality of packets,
 a reward variable of the reinforcement learning comprises packet processing information obtained as a result of the allocating of the radio resources to the at least some of the plurality of packets, and
 an action variable of the reinforcement learning comprises the updated scheduling parameter.

11. The method of claim 1, wherein the scheduling parameter is related to at least one of proportional fair scheduling, round-robin scheduling, and max carrier to interference (C/I) scheduling.

12. An electronic device configured to schedule a plurality of packets to allocate radio resources to a plurality of packets related to tasks of a plurality of user equipments (UEs) and stacked in a queue, the electronic device comprising:
 at least one processor; and
 a memory connected to the at least one processor and storing a scheduling parameter,
 wherein the at least one processor is configured to:
 set, for each packet of the plurality of packets related to the tasks of the UEs and stacked in the queue at a first point in time, a priority in the queue based on a packet parameter of the packet for which the priority is being set and a scheduling parameter, wherein the scheduling parameter is distinguished from the packet parameter, configured according to a state or method of scheduling, updated to a new parameter having an improved scheduling processing state based on a scheduling processing state, and indicating a weight of criteria used in scheduling packets in the queue, the criteria including a channel state of each of the plurality of UEs or a resource allocation to each of the plurality of UEs;
 allocate, based on the priorities set for the plurality of packets stacked in the queue at the first point in time, radio resources to at least some of the plurality of packets in the queue at the first point in time for which the priorities are set;
 updating the scheduling parameter using at least one artificial intelligence (AI) learning model;
 set, for each packet of a plurality of packets stacked in the queue at a second point in time later than the first point in time, a priority in the queue based on a packet parameter of the packet for which the priority is being set and the updated scheduling parameter; and
 allocate, based on the priorities set for the plurality of packets stacked in the queue at the second point in time, radio resources to at least some of the plurality of packets stacked in the queue at the second point in time and for which the priorities are set.

13. The electronic device of claim 12, wherein the at least one processor is further configured to:
 obtain packet processing information based on allocating the radio resources to the at least some of the plurality of packets for which the priorities are set at the first point in time; and
 deliver the obtained packet processing information to an AI module comprising the at least one AI learning model such that the obtained packet processing information is input to the at least one AI learning model.

14. The electronic device of claim 12, wherein the at least one processor is further configured to: obtain a buffer occupancy (BO) for each of the plurality of UEs and channel state information (CSI) for each UE, from the plurality of UEs.

15. The electronic device of claim 14, wherein the at least one processor is further configured to: generate packet parameters related to each of the plurality of packets stacked in the queue at the first point in time based on the obtained BO and the obtained CSI, and
 the priorities for the plurality of packets stacked in the queue at the first point in time are set based on the packet parameter and the scheduling parameter.

16. The electronic device of claim 14, wherein the at least one processor is further configured to: deliver the obtained BO and the obtained CSI to an AI module comprising the at least one AI learning model such that the obtained BO and the obtained CSI are input to the at least one AI learning model.

17. The electronic device of claim 12, wherein the at least one AI learning model comprises at least one of reinforcement learning, machine learning, continual learning, federated learning, and deep learning.

18. The electronic device of claim 12, wherein the at least one AI learning model includes a model trained through reinforcement learning,
 a state variable of the reinforcement learning comprises the plurality of packets,
 a reward variable of the reinforcement learning comprises packet processing information obtained as a result of allocating the radio resources to the at least some of the plurality of packets, and
 an action variable of the reinforcement learning comprises the updated scheduling parameter.

19. The electronic device of claim 12, wherein the scheduling parameter is related to at least one of proportional fair scheduling, round-robin scheduling, and max carrier to interference (C/I) scheduling.

20. A system configured to schedule a plurality of packets to allocate radio resources to a plurality of packets related to tasks of a plurality of user equipments (UEs) and stacked in a queue, the system comprising:
 an artificial intelligence (AI) module comprising at least one AI learning model and a data processor; wherein the data processor is configured to:
 set, for each packet of the plurality of packets related to the tasks of the EUs and stacked in the queue at a first point in time, a priority in the queue based on a packet parameter of the packet for which the priority is being set and a scheduling parameter, wherein the scheduling parameter is distinguished from the packet parameter, configured according to a state or method of scheduling, updated to a new parameter having an improved scheduling processing state based on a scheduling processing state, and indicating a weight of criteria used in scheduling packets in the queue, the criteria including a channel state of each of the plurality of UEs or a resource allocation to each of the plurality of UEs;

allocate, based on the priorities set for the plurality of packets stacked in the queue at the first point in time, radio resources to at least some of the plurality of packets in the queue at the first point in time for which the priorities are set;

update the scheduling parameter using at least one artificial intelligence (AI) learning model from the AI module;

set, for each packet of a plurality of packets stacked in the queue at a second point in time later than the first point in time, a priority in the queue based on a packet parameter of the packet for which the priority is being set and based on the updated scheduling parameter; and allocate, based on the priorities set for the plurality of packets stacked in the queue at the second point in time, radio resources to at least some of the plurality of packets stacked in the queue at the second point in time and for which the priorities are set, wherein the AI module is configured to:

obtain, from the data processor, packet processing information as a result of allocating the radio resources to the at least some of the plurality of packets for which the priorities are set at the first point in time;

generate the updated scheduling parameter based on the obtained packet processing information, using the at least one AI learning model; and deliver the updated scheduling parameter to the data processor.

21. The method of claim 1, wherein the AI learning model is trained through reinforcement learning, wherein a state variable of the reinforced learning includes the plurality of packets stacked in the queue and a reward variable of the reinforced learning includes packet processing information obtained as a result of the allocation of the radio resources to at least some of the plurality of packets stacked in the queue.

22. The method of claim 1, wherein the AI learning model is trained using information about a plurality of packets processed by the electronic device and the allocating of the radio resources to the at least some of the plurality of packets for which the priorities are set at the first point in time.

* * * * *